United States Patent
Han et al.

(10) Patent No.: US 10,771,803 B2
(45) Date of Patent: Sep. 8, 2020

(54) CONSTRAINED MOTION FIELD ESTIMATION FOR HARDWARE EFFICIENCY

(71) Applicant: GOOGLE LLC, Mountain View, CA (US)

(72) Inventors: Jingning Han, Santa Clara, CA (US); Yaowu Xu, Saratoga, CA (US); James Bankoski, Los Gatos, CA (US); Jia Feng, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/379,062

(22) Filed: Apr. 9, 2019

(65) Prior Publication Data

US 2019/0238879 A1    Aug. 1, 2019

Related U.S. Application Data

(63) Continuation of application No. 15/718,082, filed on Sep. 28, 2017, now Pat. No. 10,284,869.

(51) Int. Cl.
*H04N 19/00*        (2014.01)
*H04N 19/51*        (2014.01)
(Continued)

(52) U.S. Cl.
CPC .......... *H04N 19/51* (2014.11); *H04N 19/176* (2014.11); *H04N 19/182* (2014.11);
(Continued)

(58) Field of Classification Search
CPC .......... H04N 7/00; H04N 11/00; H04N 19/00
See application file for complete search history.

(56) References Cited

U.S. PATENT DOCUMENTS 6,735,249 B1    5/2004    Karczewicz et al.
6,816,552 B2    11/2004    Demos
(Continued)

FOREIGN PATENT DOCUMENTS

EP    3059965 A1    8/2016
EP    3139611 A1    3/2017
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Maryam A Nasri
(74) *Attorney, Agent, or Firm* — Young Basile Hanlon & MacFarlane, P.C.

(57) ABSTRACT

A method for decoding an encoded block of an encoded frame includes selecting motion vectors corresponding to blocks of an extended collocated processing unit in a first reference frame; identifying a block of the blocks, such that the encoded block is a projection, using a motion vector of the block that refers to a third reference frame, onto the encoded frame; on condition that a block is identified, determining a temporal motion vector candidate for the encoded block in a second reference frame using a motion vector of the identified block and respective display orders of the encoded frame, the first reference frame, the second reference frame, and the third reference frame, and adding the temporal motion vector candidate to a motion vector candidate list; selecting a motion vector from the motion vector candidate list; generating a prediction block using the selected motion vector for decoding the encoded block.

20 Claims, 13 Drawing Sheets

(51) Int. Cl.

| | |
|---|---|
| *H04N 19/196* | (2014.01) |
| *H04N 19/182* | (2014.01) |
| *H04N 19/176* | (2014.01) |
| *H04N 19/513* | (2014.01) |
| *H04N 19/433* | (2014.01) |
| *H04N 19/55* | (2014.01) |

(52) U.S. Cl.
CPC ......... *H04N 19/196* (2014.11); *H04N 19/433* (2014.11); *H04N 19/513* (2014.11); *H04N 19/55* (2014.11)

(56) References Cited

U.S. PATENT DOCUMENTS

| | | |
|---|---|---|
| 7,149,251 B2 | 12/2006 | Karczewicz et al. |
| 7,266,150 B2 | 9/2007 | Demos |
| 7,308,145 B2 | 12/2007 | Abe et al. |
| 7,492,952 B2 | 2/2009 | Abe et al. |
| 7,606,307 B2 | 10/2009 | Jeon |
| 7,894,524 B2 | 2/2011 | Demos |
| 8,050,323 B2 | 11/2011 | Demos |
| 8,111,754 B1 | 2/2012 | Demos |
| 8,139,638 B2 | 3/2012 | Demos |
| 8,139,639 B2 | 3/2012 | Demos |
| 8,139,640 B2 | 3/2012 | Demos |
| 8,139,641 B2 | 3/2012 | Demos |
| 8,144,774 B2 | 3/2012 | Demos |
| 8,149,912 B2 | 4/2012 | Demos |
| 8,155,200 B2 | 4/2012 | Kondo et al. |
| 8,155,201 B2 | 4/2012 | Kondo et al. |
| 8,160,142 B2 | 4/2012 | Demos |
| 8,160,149 B2 | 4/2012 | Demos |
| 8,213,507 B2 | 7/2012 | Demos |
| 8,249,158 B2 | 8/2012 | Demos |
| 8,279,929 B2 | 10/2012 | Demos |
| 8,290,043 B2 | 10/2012 | Demos |
| 8,325,809 B2 | 12/2012 | Demos |
| 8,351,503 B2 | 1/2013 | Jeon |
| 8,401,078 B2 | 3/2013 | Demos |
| 8,477,851 B2 | 7/2013 | Demos |
| 8,488,674 B2 | 7/2013 | Demos |
| 8,503,529 B2 | 8/2013 | Demos |
| 8,654,835 B2 | 2/2014 | Li et al. |
| 8,699,572 B2 | 4/2014 | Demos |
| 8,761,257 B2 | 6/2014 | Demos |
| 8,767,829 B2 | 7/2014 | Demos |
| 8,873,629 B2 | 10/2014 | Demos |
| 8,942,285 B2 | 1/2015 | Demos |
| 8,995,528 B2 | 3/2015 | Demos |
| 9,078,002 B2 | 7/2015 | Demos |
| 9,386,321 B2 | 7/2016 | Demos |
| 9,538,196 B2 | 1/2017 | Kadono et al. |
| 2010/0166079 A1* | 7/2010 | Goel ............... G11B 27/005 375/240.25 |
| 2014/0092978 A1* | 4/2014 | Bugdayci ............ H04N 19/30 375/240.16 |

FOREIGN PATENT DOCUMENTS

| | | |
|---|---|---|
| GB | 2488815 A | 9/2012 |
| WO | 2013/159038 A1 | 10/2013 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

U.S. Appl. No. 15/677,220, filed Aug. 15, 2017.

International Search Report and Written Opinion in PCT/US2018/032599, dated Jul. 23, 2018, 14 pgs.

* cited by examiner

| CODING ORDER | FRAME INDEX | PACKET STAMPS | FRAME OFFSET VALUE |
|---|---|---|---|
| 1 | 1 | 1 | 0 |
| 2 | 8 | 2 | 6 |
| 3 | 5 | 2 | 3 |
| 4 | 3 | 2 | 1 |
| 5 | 2 | 2 | 0 |
| NONE | DISPLAY 3 | 3 | N/A |
| 6 | 4 | 4 | 0 |
| NONE | DISPLAY 5 | 5 | N/A |
| 7 | 6 | 6 | 0 |
| 8 | 7 | 7 | 0 |
| NONE | DISPLAY 8 | 8 | N/A |

FIG. 7

CONSTRAINED MOTION FIELD ESTIMATION FOR HARDWARE EFFICIENCY

CROSS-REFERENCE TO RELATED APPLICATION(S)

This application is a continuation of U.S. application patent Ser. No. 15/718,082, filed Sep. 28, 2017, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A first aspect is a method for decoding an encoded block of an encoded frame, the encoded frame is processed in processing units, where a processing unit includes blocks of the encoded frame, the blocks including the encoded block. The method includes selecting motion vectors corresponding to blocks of an extended collocated processing unit in a first reference frame; identifying a block of the blocks, such that the encoded block is a valid projection, using a motion vector of the block that refers to a third reference frame, onto the encoded frame, wherein the projection comprises a scaling of the motion vector of the block using respective display orders of the encoded frame, the first reference frame, and the third reference frame; on condition that a block is identified, determining a temporal motion vector candidate for the encoded block in a second reference frame using a motion vector of the identified block and respective display orders of the encoded frame, the first reference frame, the second reference frame, and the third reference frame, and adding the temporal motion vector candidate to a motion vector candidate list; selecting a motion vector from the motion vector candidate list; generating a prediction block using the selected motion vector; and decoding the encoded block using the prediction block.

A second aspect is a method for coding a frame, the frame being processed in processing units, where a processing unit includes a block. The method includes projecting a reference block of a first reference frame onto the frame to identify the block as a projection of the reference block onto the frame, where the projecting uses a reference motion vector of the reference block, the reference motion vector refers to a second reference frame, where the reference block having a reference location in the first reference frame, and where the block having a current location in the frame; determining a temporal motion vector for the block by: on a condition that an absolute difference between the reference location and the current location not exceeding a threshold, determining a first candidate temporal motion vector for the block in a third reference frame using respective display orders of the frame, the first reference frame, the second reference frame, and the third reference frame; and coding the block using the temporal motion vector.

A third aspect is an apparatus for coding a frame, the frame being processed in processing units, where a processing unit includes a block. The apparatus performs steps including projecting a reference block of a first reference frame onto the frame to identify the block as a projection of the reference block onto the frame, where the projecting uses a reference motion vector of the reference block, the reference motion vector refers to a second reference frame, where the reference block having a reference location in the first reference frame, and where the block having a current location in the frame; determining a temporal motion vector for the block by: on a condition that an absolute difference between the reference location and the current location not exceeding a threshold, determining a first candidate temporal motion vector for the block in a third reference frame using respective display orders of the frame, the first reference frame, the second reference frame, and the third reference frame; and coding the block using the temporal motion vector.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

FIG. 7 is an illustration of an example of data used to indicate a display order of video frames of a video sequence.

DETAILED DESCRIPTION

Figure 1:
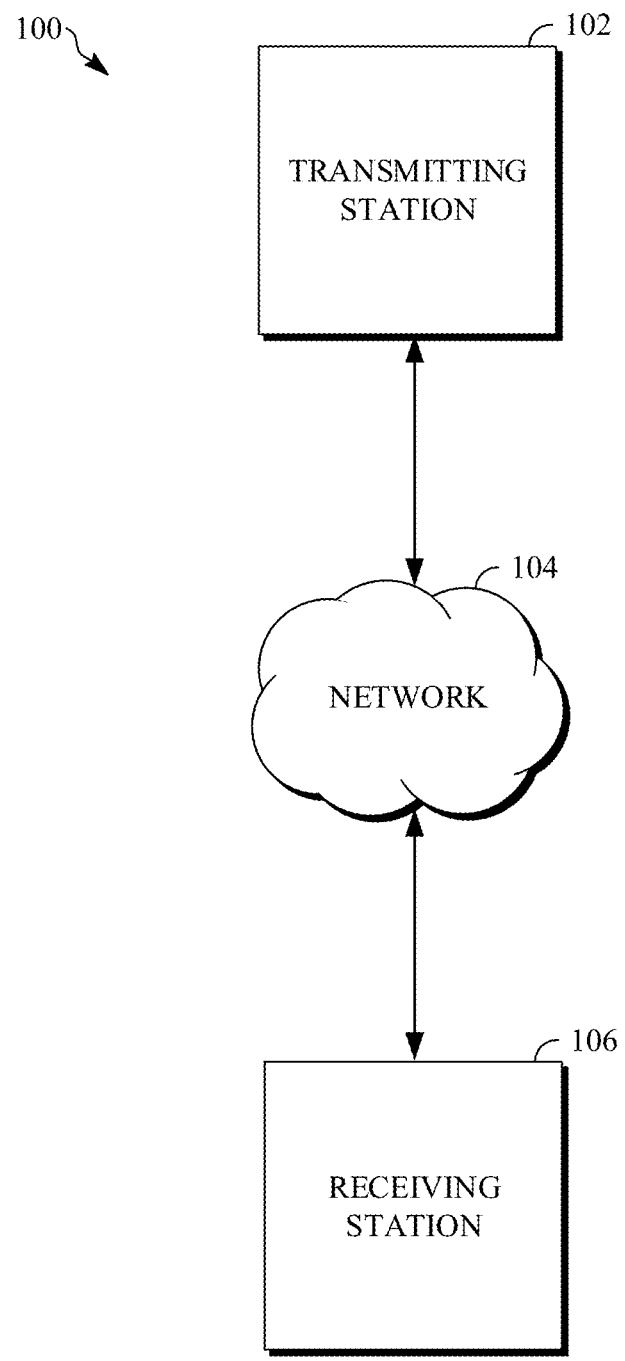
FIG. 1 is a schematic of a video encoding and decoding system.

Video compression schemes may include breaking respective images, or video frames, into smaller portions, such as video blocks, and generating an encoded bitstream using techniques to limit the information included for respective video blocks thereof. The encoded bitstream can be decoded to re-create the source images from the limited information. Encoding or decoding a video block can include predicting motion within that video block, such as with respect to one or more other video blocks in the same video frame or in a different video frame.

Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction can attempt to predict the pixel values of a block of a frame of a video stream using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder. A prediction block resulting from intra prediction is referred to herein as intra predictor.

Encoding using temporal similarities can be known as inter prediction. Inter prediction can attempt to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer. For a current block being encoded or decoded (i.e., a coding block), the motion vector describes a vertical offset and a horizontal offset in the reference frame of a collocated reference block.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be combination of a first predictor and a second predictor which can be two intra predictors (i.e., intra+intra), an intra predictor and an inter predictor (i.e., intra+inter) or two inter predictors (i.e., inter+inter). For example, in the case of inter+inter, compound inter prediction can employ a first motion vector to obtain a predictor from a first reference frame, and a second motion vector to obtain a predictor from a second reference frame. The reference frames can both be in the past, both in the future, or some combination thereof. The second motion vector can be independent of, or derived from, the first motion vector. As another example, and in the case of intra-inter, compound prediction can employ a first predictor generated by an intra prediction operation and a second predictor generated by an inter prediction operation.

In either case (i.e., intra, inter, or compound prediction), a prediction block is generated and can be subtracted from the block to be encoded to form the residual block representing the difference between the blocks. Encoding a current block in a compressed bitstream can mean encoding the residual of the current block in the compressed bitstream. Decoding a current block from a compressed bitstream can mean decoding the residual of the current block from the compressed bitstream.

As described above, some video coding systems exploit temporal motion vector correlation by using the motion vectors of the collocated block in the previously reconstructed frame (described below) as the reference motion vector. In inter-prediction, a search is performed for a reference block in the reference frame. The reference block can be used for generating a prediction block. The search for the reference block is typically performed in a relatively small window around the collocated block of the coding block.

As such, the efficacy of inter-prediction may be largely limited to tracking consistent and slow motion activities from one frame (e.g., a reference frame) to another (e.g., a coding frame). In contrast, motion trajectories with high velocities can present difficulty (e.g., sub-optimal compression performance) for codecs that use motion vector referencing systems (i.e., inter-prediction). That is, predicting the motion within a video block can be complicated by changes in the speed of motion, such as over multiple video frames in a video sequence. For example, an object moving between a series of consecutive frames may move more quickly between video frames of a first half of that series and more slowly between video frames of a second half of that series. Similarly, different portions of a frame, such as a block of the frame, can exhibit the same behavior. Different blocks of a frame can have different trajectories between consecutive frames.

Implementations according to this disclosure use motion field estimation to improve the compression performance of objects and/or blocks of a frame that exhibit motion trajectories with high velocities.

For a current frame (i.e., a frame being coded or a coding frame), motion field estimation refers to the projection of the motion vectors of reference blocks from a reference frame to build a set of motion trajectories that go through the current coding frame. While a linear projection is described herein, any mapping (i.e., projection) from a frame to another can be used. Motion field estimation can be used to trace the motion trajectory of blocks in the current coding frame to estimate their motion vectors. As described herein, a current frame (i.e., a frame being coded) can have available multiple reference frames. As such, the coding of a current frame using motion field estimation can start by projecting (i.e., intersecting) the blocks of one reference frame onto the current frame to find a corresponding projected current block. The projected current block can then be projected onto the current block's other reference frames. The intersection can be performed for all the reference frames of the current coding frame.

Information indicating a display order of the video frames of that series may be useful in determining which of the video frames may be used to predict motion within a given video block. However, that information is not typically made available to a decoder. Furthermore, there may be multiple different directions of motion between those video frames such that it is typically difficult to effectively identify the possible motion vectors to use to predict motion of a video block and select the most optimal of those motion vectors for the prediction.

To build a motion trajectory model (i.e., a projection from one frame onto another), the relative position of the reference frames with respect to the current frame can be useful. For example, a decoder implemented according to this disclosure can receive via, e.g., header information (encoded by an encoder) syntax information from which the decoder can determine the display order of the received frames. As such, relative frame distances can be directly derived from the syntax information.

Implementations of this disclosure can also include using a dynamic motion vector referencing to predict motion within video blocks of a video sequence to be encoded or decoded. The dynamic motion vector referencing selects one motion vector from a list of spatial and/or temporal motion vector candidates to predict motion within a video block. The motion vector candidates may be determined, for example, based on a motion trajectory indicated between one or more reference frames of the video sequence and a current frame including the video block to encode or decode.

The motion trajectory is determined based on a reference motion vector used for encoding or decoding one or more reference frames of the current frame. One or more temporal motion vector candidates are then determined for predicting motion within the video block based on the motion trajectory. A motion vector is selected from a motion vector candidate list including the one or more temporal motion vector candidates and used to generate a prediction block. The prediction block is then used to encode or decode the video block. The motion trajectory is based on an order of video frames indicated by frame offset values encoded to a bitstream. The motion vector candidate list may include one or more spatial motion vector candidates.

As mentioned above, the coding of a current frame using motion field estimation can start by projecting (i.e., intersecting) the blocks of one or more reference frames onto the current frame to find corresponding projected current blocks. As described below, projecting a reference block of the reference frame onto the current frame uses the motion vector of the reference block. Subsequently, when projecting a current block onto a second reference frame, the motion vector information of the reference block (from which the current block is projected) is used in the projection operation. As such, motion vector information of reference blocks are retained so that they can subsequently be used in the projecting of current blocks.

In a hardware-implemented coded, the motion vector information can be retained in a low-cost and high-capacity memory, such as dynamic random-access memory (DRAM). When performing the projection operation for a current block, motion vector information of reference blocks can be retrieved from the DRAM into a faster but more expensive memory, such as static random-access memory (SRAM). As SRAM is expensive and the bandwidth between DRAM and SRAM is limited, it is desirable to limit the amount of reference motion vector information that is required to determine temporal motion vector candidates for a current block.

Implementations according to this disclosure can include limiting the reference motion vector information that is used in generating temporal motion vector candidates by limiting the projection of a reference block onto the current block to be within a certain range. Limiting the projections to be within a certain range results in limiting the motion vector information that is retrieved from DRAM into SRAM. A current frame is typically encoded in processing units. The range can relate to the size of the processing unit.

Unless otherwise indicated, projecting a motion vector and projecting a block are used interchangeably herein. Projecting a block means projecting the offset (i.e., row and col offsets) identified by the motion vector associated with the block. Projecting a motion vector means projecting the offset (i.e., row and col offsets) identified by the motion vector that is associated with the block.

Using motion field estimation for hardware efficiency as described herein can result in compression improvements.

Further details of techniques for video coding using frame rotation are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
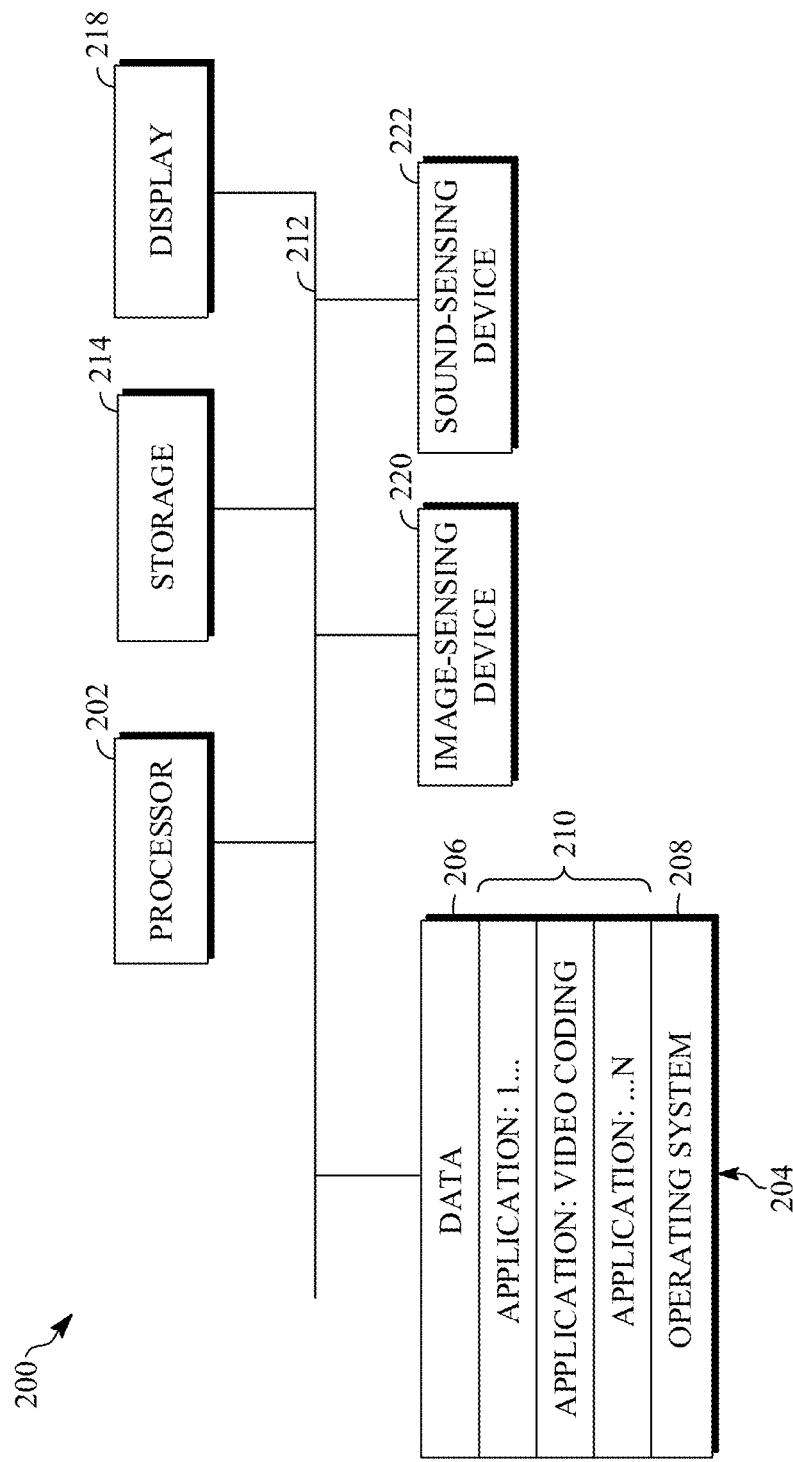
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
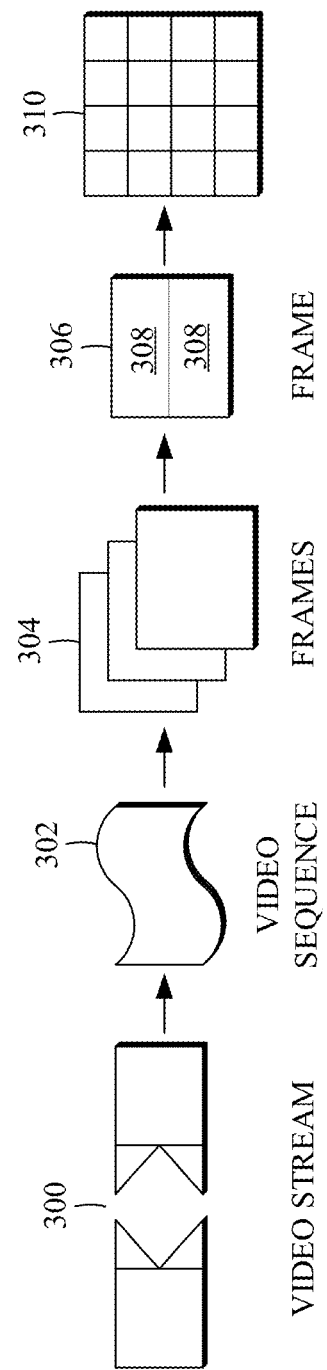
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
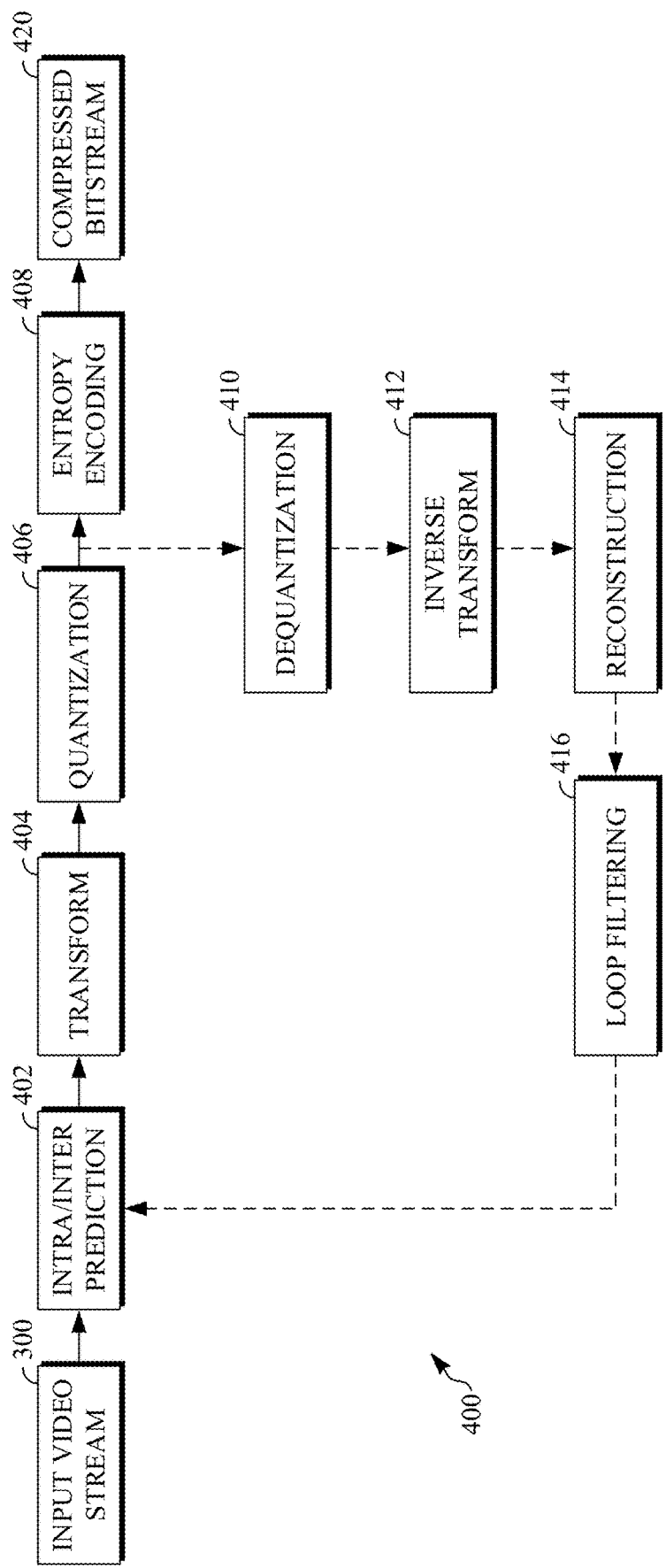
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
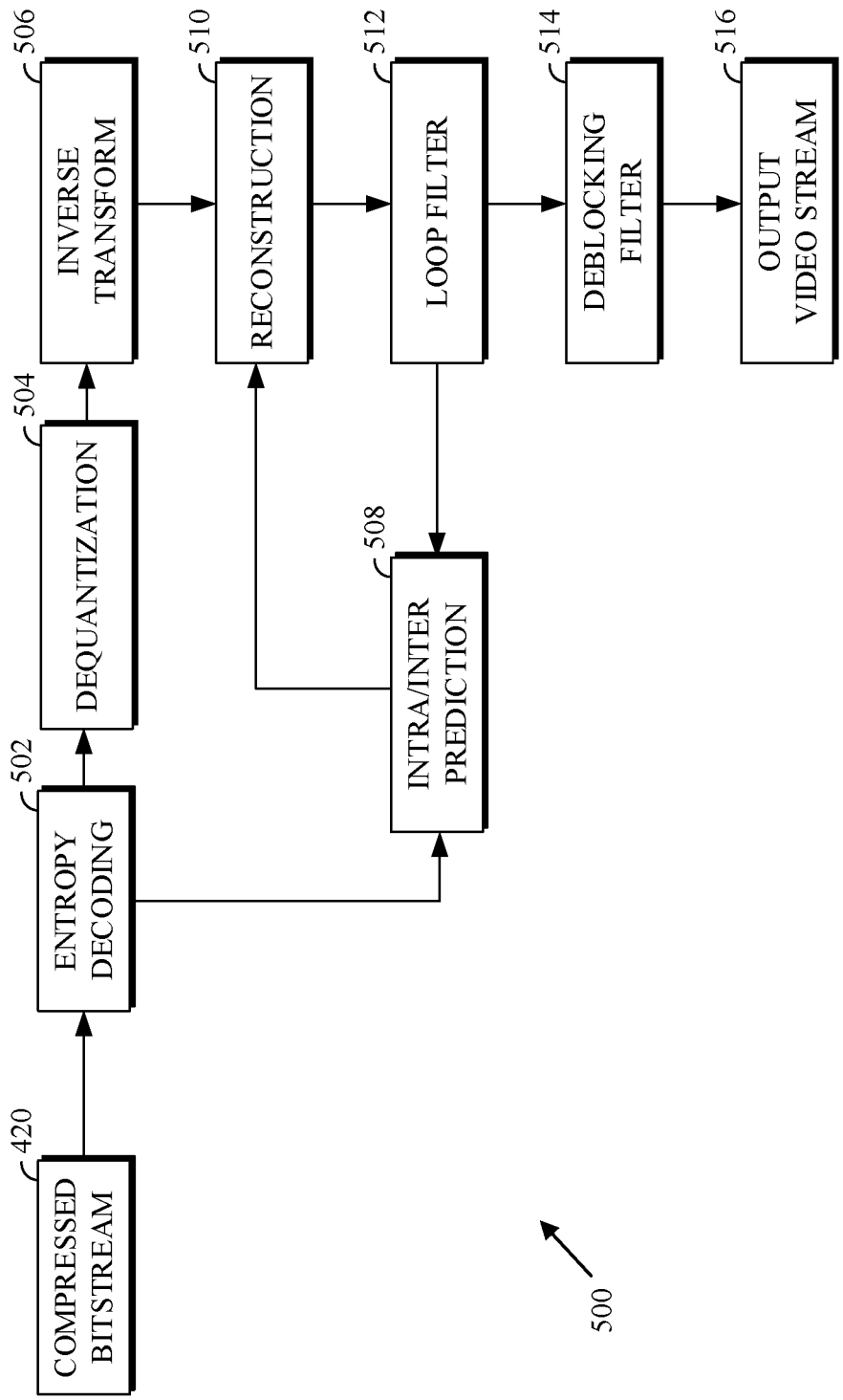
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. In some implementations, the decoder 500 can produce the output video stream 516 without the deblocking filtering stage 514.

Figure 6:
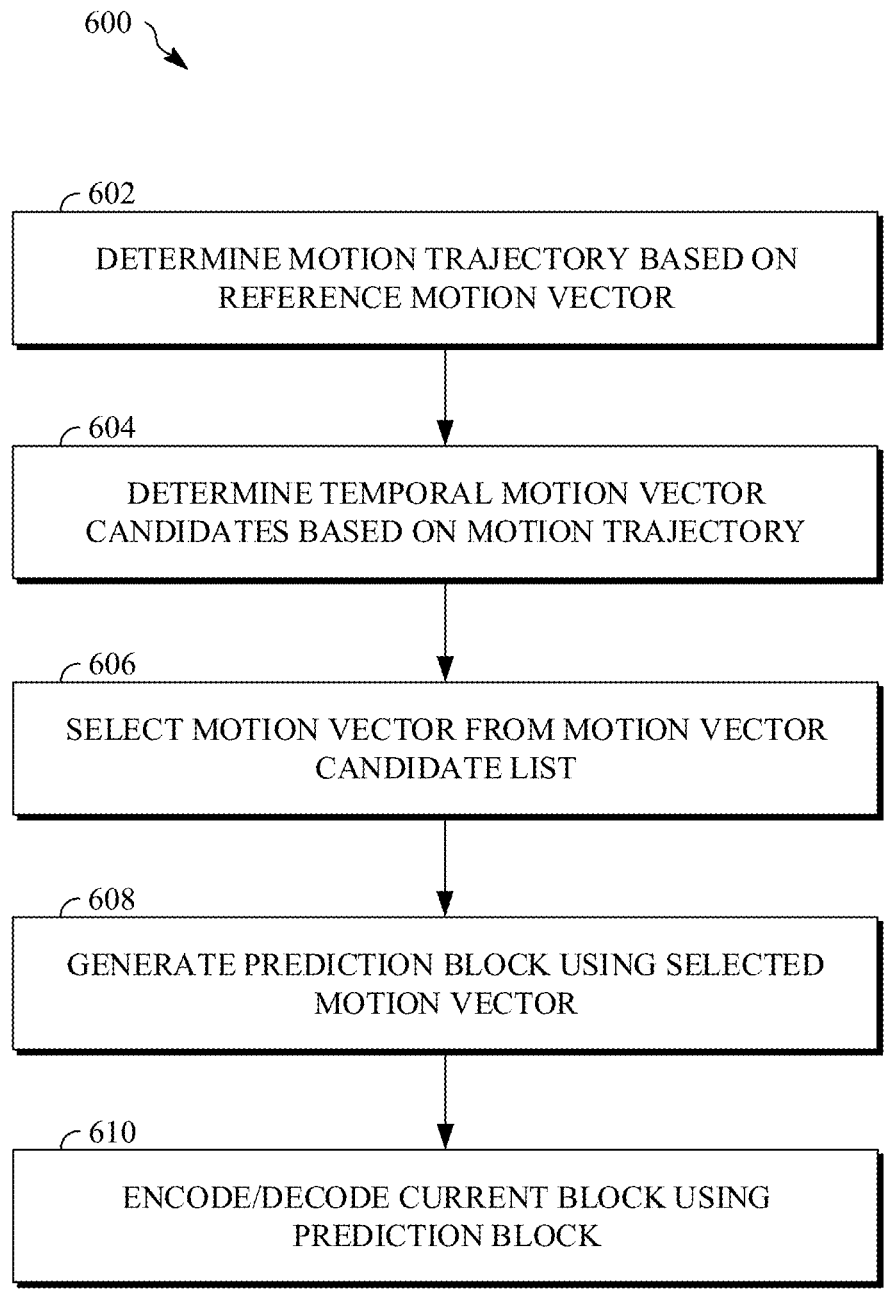
FIG. 6 is a flowchart diagram of an example of a technique for encoding or decoding a video block using dynamic motion vector referencing.

Techniques for encoding or decoding video blocks are now described with respect to FIG. 6. FIG. 6 is a flowchart diagram of an example of a technique 600 for encoding or decoding a video block using dynamic motion vector referencing. The technique 600 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 600. The technique 600 can be implemented using specialized hardware or firmware. As explained above, some computing devices may have multiple memories or processors, and the operations described in one or both of the technique 600 can be distributed using multiple processors, memories, or both.

For simplicity of explanation, the technique 600 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a motion trajectory is determined. The motion trajectory is a trajectory of motion between video frames of a video sequence including a current video block to encode or decode. The motion trajectory can, for example, show the motion of an object from a first reference frame to a current video frame including the current video block, and then from the current video frame to a second reference frame, such as where the first reference frame is a past frame with respect to the current video frame (e.g., such that the second reference frame comes before the current video frame in a display order) or a future frame with respect to that current video frame (e.g., such that the second reference frame comes after the current video frame in the display order).

The motion trajectory indicates how one or more objects move or other motion occurs between the video frames based on a path of the motion from one of the video frames to one or more of the others. As such, the motion trajectory may be based on or otherwise indicative of a display order of the video sequence. The display order of the video sequence is known to an encoder performing the technique 600 based on the input video stream received by the encoder. However, a decoder performing the technique 600 does not receive an input video stream and therefore is not typically aware of the display order of the video sequence it decodes. Instead, the decoder receives an encoded bitstream indicating a coding order of the video sequence.

The display order and the coding order for a video sequence are typically different. For example, a display order for a video sequence including eight frames may be 1, 2, 3, 4, 5, 6, 7, and 8. However, a coding order for that video sequence may, for example, instead be 1, 5, 4, 6, 3, 7, 8, and 2, such as where a hierarchical framework is used for encoding and decoding the frames of the video sequence. As such, the encoder and the decoder may both know which reference frames of the video sequence are usable for encoding or decoding the current video block; however, without further information being provided to the decoder, the decoder cannot leverage information about the display order of the video sequence to decode the current video block. In a hierarchical coding framework, the frames of a video may be grouped into groups of pictures (GOPs). Each group of pictures (GOP) can include a number of frames (e.g., 8 or 16 frames). Coding a frame of a GOP can use frames that are prior (i.e., past frames) or subsequent (i.e., future frames) to the frame in the display order in the GOP. For example, given the coding sequence above (i.e., 1, 5, 4, 6, 3, 7, 8, and 2), coding the fourth frame (i.e., the frame 4 in the display order) uses the past frame 1 and the future frame 5.

Certain video frames included in the coding order may not be included in the display order. Such video frames, referred to as alternative reference frames, are decoded, but not displayed as part of an output video sequence. Instead, alternative reference frames remain in the reference frame buffer for use in predicting motion in video blocks of video frames that are output for display. An encoder may encode one or more syntax elements to a bitstream to indicate the locations of alternative reference frames in a coding order for a video sequence. A decoder can decode those one or more syntax elements to determine to use an alternative reference frame from the reference frame buffer rather than use a frame for display.

Data usable to determine the display order of the video sequence may be received by a decoder to determine the display order of the video sequence to decode the current video block. That data may include one or more frame offset values that indicate respective locations of video frames in a display order of a video sequence.

A frame offset value for a video frame is determined based on a frame index for that video frame and a number of packet stamps after which the video frame will be displayed. The frame index of a video frame reflects the location of that video frame in a display order, as known to the encoder (e.g., based on an input video stream received for encoding by the encoder). During an encoding operation, the encoder determines the frame indexes of the video frames in the video sequence being encoded. The first frame in the display order of the video sequence has an index of 1, and the Nth frame in that display order has an index of N. However, whereas the first frame in that is the first video frame to be encoded, the next video frame to be encoded may be a video frame located in the middle of the video sequence.

When a video frame is encoded to a bitstream, the data indicative of the encoded video frame can be stored in a packet. A packet includes information about one or more video frames of a video sequence. One of those video frames is a displayable video frame to be displayed subsequent to decoding using a decoder. The others of those video frames are reference frames used to decode the video frame to be displayed.

The number of jumps for a packet reflects the number of video frames that have to be decoded by a decoder in order to display the displayable video frame, such as by outputting the displayable video frame to an output video stream. For example, when a decoder receives a packet including N video frames, the decoder decodes the first N-1 video frames and uses those as reference frames for decoding the Nth video frame, which Nth video frame is then output for display. The number of packet stamps for a packet indicates the total number of video frames displayed after that packet has been decoded. The encoder can determine the number of packet stamps based on the number of reference frames used to encode a given video frame.

Subsequent to determining a frame index and a number of packet stamps for a video frame, the frame offset value is calculated as the difference between the frame index and the number of packet stamps. For example, for a video frame having a frame index of 1 and 1 packet stamp, the frame offset value is 0. In another example, for a video frame having a frame index of 8 and 2 packet stamps, the frame offset value is 6. In yet another example, for a video frame having a frame index of 2 and 2 packet stamps, the frame offset value is 0. Examples of relationships between frame indexes, numbers of packet stamps, and frame offset values are described below with respect to FIG. 7.

The motion trajectory is determined for the current video frame based on a reference motion vector used for coding one or more reference frames of the current video frame. For example, the reference motion vector may be a motion vector indicating or otherwise used to predict motion between one of reference frames usable to predict motion of the current video block and a reference frame used to encode or decode one or more video blocks in that one of the reference frames. For example, the order of those reference frames for predicting motion therebetween can be indicated to an encoder based on an input video stream and to a decoder based on frame offset values. Based on that order, a linear interpolation can be performed using the reference motion vector against a reference frame usable for encoding or decoding the current video block and a reference frame used for encoding or decoding that reference frame.

Performing the linear interpolation against those frames can include projecting a group of pixels of one reference frame from a location of that reference frame to a location within another reference frame. For example, a 4×4 or 8×8 block of pixels located at a position within a first reference frame can be projected to a position within a second reference frame. The first reference frame is a reference frame used to encode or decode one or more video blocks of the second reference frame, and the second reference frame is a reference frame usable to predict motion of the current video block. For example, the first reference frame may be a past frame and the second reference frame may be a future frame. There may be one or more other reference frames intermediate to the first reference frame and the current video frame. Examples of motion trajectories are described below with respect to FIGS. 8 and 9.

Determining the reference motion vector can include processing regions of a first reference frame usable to predict motion within the current video block. For example, processing the regions of the first reference frame can include comparing different groups of pixel values (e.g., 4×4 blocks, 8×8 blocks, or the like) of the first reference frame to same-dimensioned groups of pixel values in a second reference frame used to predict the motion of the first reference frame. For example, encoding or decoding a current frame may first include processing some or all 4×4, 8×8, or other-dimensioned blocks within some or all reference frames usable to predict motion within that current frame.

Subsequent to determining the reference motion vector, the reference motion vector is projected to the current video frame to determine where the motion trajectory fits within the current video frame. The location of the current video frame at which the motion trajectory fits the current video frame is the location of the current video block. For example, the row location of the current video block within the current video frame can be determined as Block_Row= RefMV.row*(1stRefFrame−CurrFrame)/(1stRefFrame−2nd RefFrame), and the column location of the current video block within the current video frame can be determined as Block_Col=RefMV.col*(1stRefFrame−CurrFrame)/(1stRefFrame−2ndRefFrame).

At 604, one or more temporal motion vector candidates are determined for predicting motion within the current video block based on the motion trajectory. The temporal motion vector candidates define a motion field estimate for current video block. The motion field estimate refers to the current video block and one or more other regions of the video frame including the current video block (e.g., 4×4, 8×8, or other-sized regions adjacent to or otherwise surrounding the current video block within the current video frame).

The motion field estimate includes one or more temporal motion vectors indicating motion between the current video frame, one or more first reference frames usable to predict motion of the current video block of the current video frame, one or more second reference frames usable to predict motion of video blocks of those one or more first reference frames, or the like, or a combination thereof. Each of the temporal motion vectors may, for example, refer to the motion of a group of N pixels (e.g., a 4×4 block, an 8×8 block, or the like) from a location in one video frame to a location in another video frame.

A temporal motion vector candidate is determined based on the location of the current video block, determined above using the reference motion vector. Determining the first temporal motion vector candidate includes performing a linear interpolation against a first reference frame and the current video frame based on the location of the current video block within the current video frame. The first temporal motion vector candidate may thus indicate a group of pixels in the first reference frame that show the object within the current video block. For example, the row location of the group of pixels in the first reference frame can be determined as Block_Row=RefMV.row*(CurrFrame−1stRefFrame)/(1stRefFrame−2ndRefFrame), and the column location of the group of pixels in the first reference frame can be determined as Block_Col=RefMV.col*(CurrFrame−1stRefFrame)/(1stRefFrame−2ndRefFrame). Multiple temporal motion vector candidates can be determined in this way, such as based on the number of reference frames used.

At 606, a motion vector to use for encoding or decoding the current video block is selected. The selected motion vector is selected from a motion vector candidate list including the one or more temporal motion vector candidates determined based on the motion trajectory. Selecting the motion vector to use for the encoding or the decoding includes determining rate-distortion values resulting from predicting motion within the current video block using motion vector candidates of the motion vector candidate list. The motion vector candidates of the motion vector candidate list may, for example, include the one or more temporal motion vector candidates determined based on the motion trajectory.

A rate-distortion value refers to a ratio that balances an amount of distortion (e.g., a loss in video quality) with rate (e.g., a number of bits) for coding a block or other video component. The rate-distortion values may, for example, be determined by performing a rate-distortion analysis against ones of the temporal motion vector candidates of the motion vector candidate list (and/or other motion vector candidates as may be included in that list). As a result of the rate-distortion analysis, the one of the motion vector candidates used to determine a lowest one of the rate-distortion values is identified, such as by comparing respective ones of the rate-distortion values. That motion vector candidate is then selected as the selected motion vector.

The motion vector candidate list includes information indicative of the motion vector candidates usable to predict motion of the current video block. The motion vector candidate list may be a list stored or otherwise maintained in a buffer, table, database, or other data store or record, which list is updated whenever a new motion vector candidate is determined. Alternatively, the motion vector candidate list may be created subsequent to the determination of a first motion vector candidate and deleted subsequent to the selection of the selected motion vector.

At 608, a prediction block is generated using the selected motion vector. The prediction block can include pixel values indicating a prediction of the motion of the current video block according to the selected motion vector. Generating the prediction block can include generating a prediction residual based on a difference between pixel values of the current video block and pixel values of the prediction block. For example, during operations for encoding the current video block, the prediction residual can be generated using operations performed by the encoder 400 shown in FIG. 4 (e.g., at the intra/inter prediction stage 402). In another example, during operations for decoding the current video block, the prediction residual can be generated using operations performed by the decoder 500 shown in FIG. 5 (e.g., at the intra/inter prediction stage 508).

At 610, the current video block is encoded or decoded using the prediction block. For example, operations for encoding the current video block using the prediction block can include transforming, quantizing, and entropy encoding the prediction residual to an encoded bitstream (e.g., the compressed bitstream 420 shown in FIG. 4). In another example, operations for decoding the current video block using the prediction block can include reconstructing the video block based on the prediction residual, filtering the reconstructed video block, and outputting the filtered video block to a video stream (e.g., the output video stream 516 shown in FIG. 5).

In some implementations, the technique 600 includes determining one or more spatial motion vector candidates based on one or more neighbor blocks of the current block. For example, the one or more spatial motion vector candidates can include one or more motion vectors determined using intra-prediction. For example, where the blocks of the video frame including the current video block are scanned in a raster order, a spatial motion vector candidate can be determined based on motion predicted using an above-neighbor block of the current video block, a left-neighbor block of the current video block, or the like, or a combination thereof.

The one or more spatial motion vector candidates may be organized into two different categories. A first category includes spatial motion vector candidates determined using one or more neighbor blocks immediately adjacent to the current video block. A second category includes spatial motion vector candidates determined using one or more neighbor blocks surrounding, but not immediately adjacent to, the current video block. For example, a spatial motion vector candidate in the second category may be derived using a block that is two blocks away from the current video block.

Spatial motion vectors in the first category may be prioritized over those in the second category. For example, if two different spatial motion vector candidates may both result in the same performance for predicting motion in the current video block, but each was from a different one of the two categories, the spatial motion vector candidate of the first category would be selected over the other.

The one or more spatial motion vector candidates may be included in the motion vector candidate list that includes the one or more temporal motion vector candidates determined based on the motion trajectory. As such, in such an implementation, selecting the motion vector from the motion vector candidate list can include performing a rate-distortion analysis against one or more temporal motion vector candidates and one or more spatial motion vector candidates and selecting one of the temporal motion vector candidates or the spatial motion vector candidates as the selected motion vector.

In some implementations, the technique 600 includes encoding one or more syntax elements to a bitstream to which the current block is encoded. For example, when the technique 600 is performed during operations for encoding a current video block, the one or more syntax elements encoded to the bitstream may indicate of the selected motion vector, a display order of a video sequence including the current frame and the one or more reference frames, or the like, or a combination thereof. The one or more syntax elements may, for example, be encoded to a frame header of the current frame including the current video block. For example, the one or more syntax elements used to indicate the display order of the video sequence can include four, five, or some other number of bits for indicating frame offset values of the video frames of the video sequence.

In another example, the one or more syntax elements used to indicate the selected motion vector can include a number of bits for indicating a location within a reference frame of a block of pixels corresponding to the selected motion vector, an index of the selected motion vector within the motion vector candidate list, or the like, or a combination thereof. The number of bits can be based on the total number of motion vector candidates included in the motion vector candidate list. For example, when the motion vector candidate list includes two candidates, one bit can be used to indicate the selected motion vector (e.g., where each of the motion vector candidates is associated with one of the values of the bit, or by using a value of 1 to indicate the location of the block of pixels including the motion indicated by the selected motion vector). In another example, when the motion vector candidate list includes two candidates, two bits can be used.

Alternatively, the one or more syntax elements used to indicate the selected motion vector can indicate context information associated with the selected motion vector. For example, when the selected motion vector is a spatial motion vector, the one or more syntax elements may indicate whether that selected motion vector was derived from an above-neighbor block, a left-neighbor block, or a block surrounding but not immediately adjacent to the current video block. In another example, the one or more syntax elements may indicate whether the selected motion vector was derived from a first category of spatial motion vector candidates or a second category of spatial motion vector candidates.

At least one of the one or more syntax elements indicates a frame offset value for the current frame, which frame offset value indicates a location of the current frame in a video sequence. For example, the syntax elements indicating the frame offset value can include a number of bits based on the number of look-ahead frames used by the encoder and decoder. For example, when the number of look-ahead frames is 16, four bits may be used to indicate the frame offset value. In another example, when the number of look-ahead frames is 32, five bits may be used to indicate the frame offset value.

In some implementations, the technique 600, when performed during operations for decoding a current video block, includes decoding one or more syntax elements from a bitstream including an encoded frame to decode. For example, the one or more syntax elements decoded from the bitstream may indicate a frame offset value for the encoded video frame. In another example, the one or more syntax elements decoded from the bitstream may indicate a motion vector selected for encoding the encoded block during operations for encoding the block.

In some implementations, the technique 600 can include determining that the motion vector selected during the operations for decoding the video block corresponds to the motion vector indicated by the one or more decoded syntax elements. For example, subsequent to selecting a motion vector for predicting motion within a current video block to decode, the motion vector indicated within the bitstream can be compared to the selected motion vector. The comparing may include comparing motion vector indexes for each of the selected and indicated motion vectors, comparing blocks of pixels at locations within one or more reference frames as indicated by each of the selected and indicated motion vectors, or the like, or a combination thereof.

In some implementations, selecting the motion vector during decoding operations can include determining multiple motion vector candidates (e.g., temporal and/or spatial) and then comparing the determined motion vector candidates to the motion vector indicated in a bitstream including the encoded block and encoded video frame. For example, responsive to identifying that one of the determined motion vector candidates is the motion vector indicated in the bitstream, the decoder can select that identified motion vector candidate.

In some implementations, the technique 600 includes updating a probability model associated with the video frame or the video sequence to indicate the motion vector selected for predicting the motion of the current video block. For example, the probability model can be updated to reflect the probability of a particular motion vector (e.g., based on index), a particular type of motion vector (e.g., temporal or spatial), or context information for the motion vector (e.g., a neighbor block associated with the motion vector) being selected. Each of the encoder and decoder can maintain their own probability models.

In some implementations, motion vectors other than the one or more temporal motion vector candidates or the one or more spatial motion vector candidates may be included in the motion vector candidate list. For example, the motion vector candidate list can include the reference motion vector used to determine the motion trajectory. In another example, the motion vector candidate list can include a motion vector used to predict a collocated block within a neighbor video frame of the current video frame.

FIG. 7 is an illustration of an example of data used to indicate a display order of video frames of a video sequence. In particular, a table 700 includes a coding order, a frame index, a number of packet stamps, and a frame offset value for each of a plurality of video frames of a video sequence to encode or decode. The coding order includes spaces between codings of frames, such as between 5 and 6 and after 8. These spaces indicate when an alternative reference frame is encoded or decoded, as applicable. The frame index indicates the alternative reference frame used for those spaces. For example, the video frame located 3rd in the display order of the video sequence is encoded or decoded, as applicable, between 5 and 6 in the coding order. There is no frame offset value for these spaces since there is no video frame to display.

In an implementation, an encoder can encode, and a decoder can decode, syntax information that enable a decoder to determine the relative distance between a current coding frame from any of its reference frames. Frames are sent by an encoder (e.g., encoded in a bistream) and received by a decoder (e.g., decoded from the bitstream) in packets. Each packet can have a packet stamp. For example, the packet having the packet stamp of two (2) includes the frames 8, 5, 3, and 2. The syntax information can include a packet stamp and a frame offset value. The packet stamp can be included in the packet header. The frame offset value can be included in the header of a frame.

The packet stamp can indicate the frame number to be displayed. Frames in a packet that do not correspond to the packet stamp can be decoded and used as reference frame (i.e., added to the reference frame buffer). Only frames corresponding to the packet stamp are displayed.

The frame offset value can indicate after how many packet stamps, a frame will be displayed. The frame offset value can indicate the offset of the frame within and GOP that includes the frame. For example, a frame 702 is received with a frame offset value of 6 and is included in the packet having a packet stamp of 2. As such, the frame 702 is to be displayed after 6 frame packet numbers are received. As the frame offset value of the frame 702 does not correspond to the packet stamp, the frame 702 is not displayed and can be added to the reference frame buffer. Also, using the frame offset value (i.e., 6) and the packet stamp (i.e., 2), a decoder can determine that the frame index is the $8^{th}$ (i.e., 6+2=8) frame in the display order. The frame index corresponds to the frame display order. When a frame 704 is received at the decoder, the decoder will display the frame 704 since its frame offset value is zero (0), which indicates that this is the frame to be displayed. A decoded and displayed frame can also be added to the reference frame buffer.

In the hierarchical coding structure, the first frame in the GOP can be decoded and displayed first. As such, the first packet for the GOP can have a packet stamp of 1 and can include only the first frame. When a frame 706 is received, the frame offset value of the frame 706 is zero indicating that the frame is to be decoded and displayed.

As described above, using the frame offset values and the packet stamps, a decoder can determine the frame indexes. Using the frame indexes, the frame distance between any two frames can be calculated. The frame distances and/or the frame indexes can be used in performing the linear projections.

Figure 8:
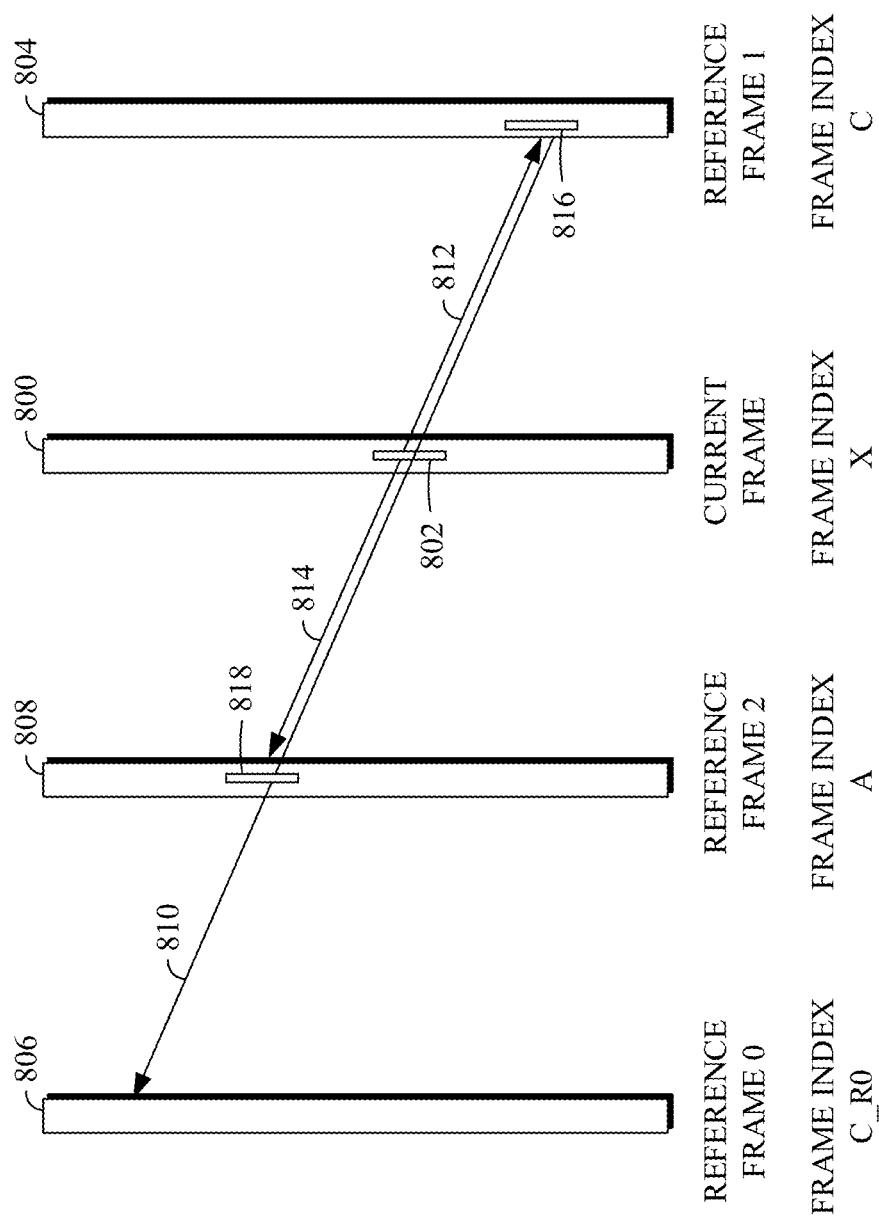
FIG. 8 is a diagram of an example of using a motion trajectory for a current frame to predict motion of a current block.

FIG. 8 is a diagram of an example of using a motion trajectory for a current frame 800 to predict motion of a current block 802. The motion trajectory shows motion between the current frame 800 and three reference frames 804, 806, and 808. The motion trajectory is determined based on a reference motion vector 810, which indicates motion between the reference frame 0 806 and the reference frame 1 804. For example, the reference frame 0 806 may be a reference frame used to predict motion of one or more blocks of the reference frame 804. After the reference motion vector 810 is determined, the motion trajectory is determined as the trajectory corresponding to the direction of the reference motion vector 810.

The motion trajectory identifies the current block 802 as the location of the current frame 800 intersected by the motion trajectory. A first temporal motion vector candidate 812 may then be determined as indicating motion between the reference frame 1 804 and the current frame 800. A second temporal motion vector candidate 814 may be determined as indicating motion between the reference frame 2 808 and the current frame 800. One or more of the reference motion vector 810, the first temporal motion vector candidate 812, or the second temporal motion vector candidate 814 may be included in a motion vector candidate list from which a motion vector is selected for predicting motion of the current block 802.

The reference frame 0 806 and the reference frame 2 808 are shown as past frames with respect to the current frame 800. The reference frame 1 804 is shown as a future frame with respect to the current frame 800. However, other numbers of past or future reference frames may be used. For example, a motion trajectory can be determined where there is one past reference frame and one future reference frame. In another example, a motion trajectory can be determined where there is one past frame and two future reference frames. In another example, a motion trajectory can be determined where there are two or more past reference frames and two or more future reference frames.

In an implementation, motion information associated with blocks of a reference frame can be used to perform linear projections of blocks of a current frame in order to estimate the motion field of the current frame. That is, the motion information associated with blocks of the reference frame can be used to estimate the motion information (i.e., the motion field) of some blocks of the current frame.

As described above, a block can be predicted using inter prediction. When a frame is reconstructed (as described above with respect to the reconstruction stage 414 of FIG. 4 and the reconstruction stage 510 of FIG. 5), a type and the motion vector associated with each coding block can be retained (i.e., saved). The type can be associated with a frame rather than with each block of the frame. The type can indicate which reference frame(s) is (are) used to code blocks of the frame. As such, the type can indicate which reference frame a motion vector points to and the motion vector indicates the offset within the reference frame. The type and motion vector information (collectively, the motion information) can be retained for blocks of size 4×4, 8×8, or some other same-dimensioned block sizes.

For example, when the reference frame 1 804 is reconstructed, the prediction type and motion vector information associated with blocks of the reference frame 1 804 can be retained. For example, the reference motion vector 810 and a type indicating the reference frame 806 are retained for a block 816 of the reference frame 1 804.

As mentioned above, the reference frame 1 804 can be used as a reference frame for the current frame 800. As such, the retained information of the blocks of the reference frame 1 804 can be used to perform linear projections to estimate the motion field of the current frame 800. The motion field of the current frame means the collective motions fields of blocks of the current frame.

Figure 9:
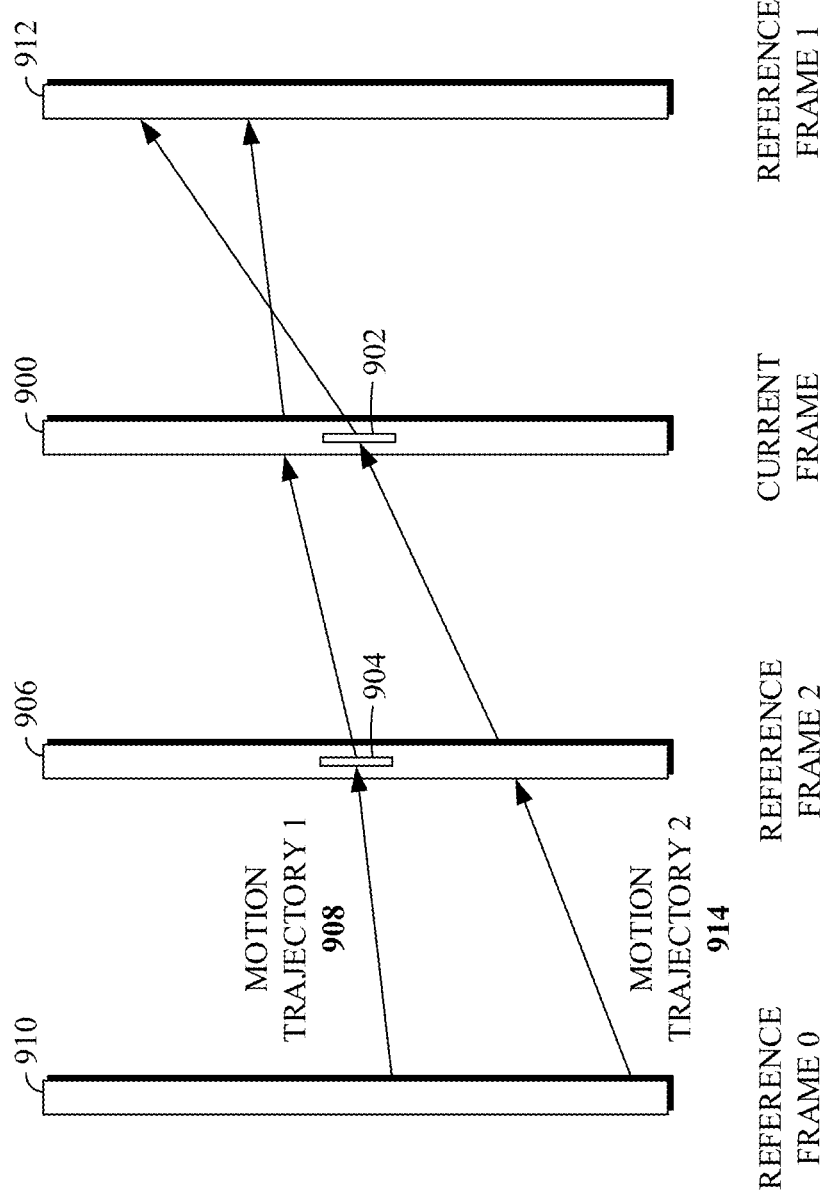
FIG. 9 is a diagram of an example of using multiple motion trajectories to predict motion of a current block.

FIG. 9 is a diagram of an example of using multiple motion trajectories to predict motion of a current block. The motion trajectory shown in and described with respect to FIG. 8 has a constant slope from the past-most reference frame to the future-most reference frame and thus indicates that the motion between the video frames thereof occurs at a constant rate. However, this may not always be the case, such as where motion speeds up or slows down between video frames.

A current frame 900 includes a current block 902 to encode or decode. When the motion is very slow, a collocated block 904 at a preceding reference frame 2 906 may be used to predict motion of the current block 902. However, if the motion is not slow enough, the corresponding motion trajectory may not intersect the current block 902 such that the collocated block 904 may not be used. For example, a first motion trajectory 908 from a past-most reference frame 0 910 to a future-most reference frame 1 912 intersects the current frame 900 slightly above the current block 902.

In such a case, a motion field estimate for the current block 902 can be used, such as to identify motion from the collocated block 904 within an extended region of the current block 902 (e.g., a group of one or more 4×4, 8×8, or other-dimensioned blocks surrounding the current block 902 within the current frame 900). For example, the extended region may be defined based on the locations within the current frame 900 of objects from one or more of the reference frames 906, 910, 912, such as where the motion of those objects is indicated using one or more temporal motion vector candidates.

The motion field estimate may, for example, reflect the locations of all motion within the current frame 900 with respect to the available reference frames. For example, the motion field estimate may be used to determine a second motion trajectory 914 from the reference frame 0 910 to the reference frame 1 912. The second motion trajectory 914 intersects the current frame 900 at the current block 902. As such, a motion vector candidate associated with the second motion trajectory 914 may more accurately predict motion of the current block 902 itself than a motion vector candidate associated with the first motion trajectory 908.

Figure 10:
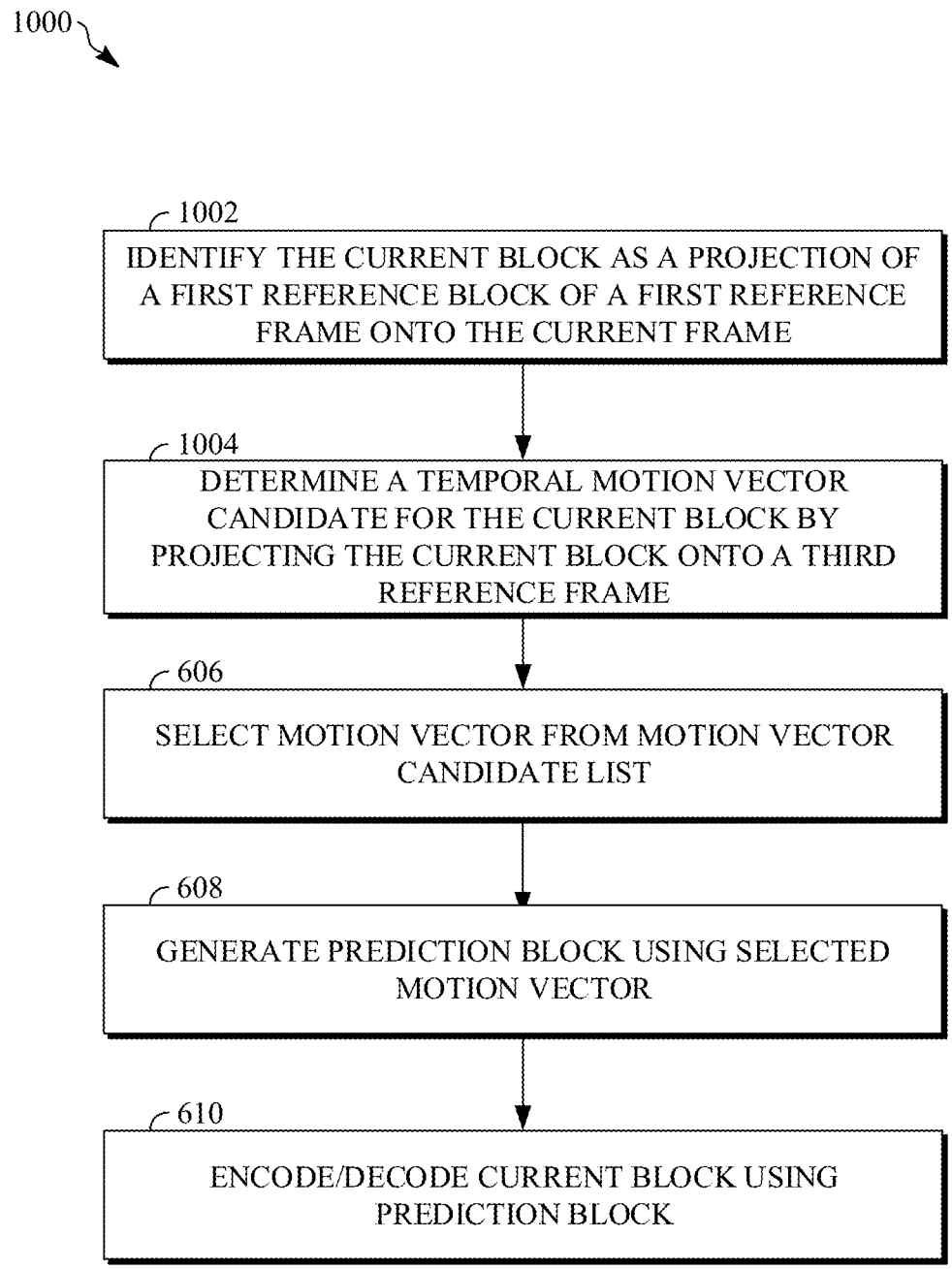
FIG. 10 is a flowchart diagram of an example of a technique for coding a current block of a current frame according to an implementation of this disclosure.

FIG. 10 is a flowchart diagram of an example of a technique 1000 for coding a current block of a current frame according to an implementation of this disclosure. The technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 1000. The technique 1000 can be implemented using specialized hardware or firmware. As explained above, some computing devices may have multiple memories or processors, and the operations described in one or both of the technique 1000 can be distributed using multiple processors, memories, or both.

The technique 1000 can be implemented by an encoder, such as the encoder 400 of FIG. 4. When implemented by an encoder, coding means encoding in an encoded bitstream, such as the compressed bitstream 420 of FIG. 4. The technique 1000 can be implemented by a decoder, such as the decoder 500 of FIG. 5. When implemented by a decoder, coding means decoding from an encoded bitstream, such as the compressed bitstream 420 of FIG. 5.

The technique 1000 can receive a frame to be coded, such as the frame 304 of FIG. 3. As used in this disclosure, "receive" means to select, construct, determine, identify, specify or other receive in any manner whatsoever. For example, the technique 1000 can, as described with respect to FIG. 3, partition the frame into blocks 310. The current block can be one of the blocks 310. Alternatively, the technique 1000 can receive one of the blocks 310 as the current block. For example, when implemented by an encoder, the technique 1000 can receive a current frame to be encoded (also referred to as coding frame or a current frame). The technique 1000 can partition the frame into blocks or into other partitions that include blocks and select one of the blocks for encoding. In another example, the technique 1000 can receive the block to be encoded. When implemented by a decoder, the technique 1000 can select or identify a current block to be decoded.

As described above, for at least some reference frames (e.g., some or all of the reference frames 804, 806, and 808), the technique 1000 can retain motion information for each block that is predicted using a motion vector. The block size can be 4×4, 8×8, or any other block size. For example, for the block 816, the retained motion information includes that the reference frame 0 806 is the reference frame used for the block 816. The retained motion information also includes the reference motion vector 810. If a block of a frame is not predicted using a motion vector (e.g., a block predicted using intra or intra+intra compound prediction), then the reference frame type is invalid. In the following description, projection (i.e., intersection) is skipped for those blocks with invalid motion information (i.e., block with an invalid reference frame type).

The projection operation is now described with respect to the block 816 (i.e., a first reference block). It is to be understood that the description is applicable to other blocks of a reference frame having valid motion information. In a first step, the linear projection is performed to determine where the motion vector of a reference block intersects the current frame. The intersection identifies the current block as the projection of the reference block. The projection operation results in a derived motion vector for the current block. For example, the block 816 is projected onto the current frame using the reference motion vector 810. The projection operation results in a predicted motion vector.

As described above, a motion vector contains two components, namely, a row value and a column value that represent the spatial offset from the collocated block in a reference frame. As such, the reference motion vector 810 includes, as described with respect to 602 of FIG. 6, a RefMV.row and a RefMV.col. Assuming, as shown in FIG. 8, that the current frame 800 and three reference frames 804, 806, and 808 have, respectively, the frame indexes X, C, C_R0, and A, then the predicted motion vector can be determined using equation (1):

$$\begin{cases} Block\_Row = RefMV.row * (C - X)/(C - C\_R0) \\ Block\_Col = RefMV.col * (C - X)/(C - C\_R0) \end{cases} \quad (1)$$

Block_Row and Block_Col identify the position of a block in the current frame. For example, if RefMV.row and RefMV.col correspond to a top left corner of a block in the reference frame, then Block_Row and Block_Col also correspond to the top left corner of a block in the current frame.

The calculated values Block_Row and Block_Col may not align with a block boundary of the current frame. In an implementation, the Block_Row and Block_Col are rounded such that the result of the projection aligns with a block of the current frame. For example, as shown in FIG. 3, the blocks 310 of a frame form a block grid. Rounding the Block_Row and Block_Col causes the projection onto the current frame to align with the block grid. For example, if the current frame is processed in 4×4 units, then the projection is rounded to align to the nearest 4×4 block, such as by rounding to the nearest multiple of 4. As another example, if the current frame is processed in 8×8 units, then the projection is rounded to align to the nearest 8×8 block.

At 1002, the technique 1000 identifies the current block as a projection of a first reference block of a first reference frame onto the current frame. As used in this disclosure, "identify" means to select, construct, determine, specify or other identify in any manner whatsoever. The projection uses a first motion vector of the reference block with respect to a second reference frame.

Referring to FIG. 8 for an illustration, the current block can be the current block 802, which is identified as a projection of the block 816 (i.e., first reference block) of the reference frame 1 804 (i.e., the first reference frame) onto the current frame 800. The projection uses the reference motion vector 810 (i.e., the first motion vector), which is the motion vector of the block 816 with respect to the reference frame 0 806 (i.e., the second reference frame).

At 1004, the technique 1000 determines a temporal motion vector candidate for the current block by projecting the first motion vector onto a third reference frame. As used in this disclosure, "determine" means to select, construct, identify, specify or other determine in any manner whatsoever. The temporal motion vector candidate identifies a second reference block in the third reference frame. As described above, the current frame can have available multiple reference frames. As such, the technique 1000 can project the current block onto one, more than one, or all of the available reference frames to identify one or more second reference blocks (i.e., one or more temporal motion vector candidates).

The technique 1000 projects the magnitude of the first motion vector onto a third reference frame to identify a temporal motion vector candidate. The temporal motion vector candidate in turn identifies (e.g., points to) the second reference block. For example, assuming that the reference frame 808 is an available reference frame for the current frame 800, and given the coordinates Block_Row and Block_Col of the current block 802 and the reference motion vector 810 (from which the current block 802 was projected onto the current frame 800), the technique 1000 can identify the second reference block (i.e., a block 818) by determining the temporal motion vector candidate (i.e., the second temporal motion vector candidate 814) that points to the second reference block in the third reference frame (e.g., the reference frame 808) using equation (2):

$$\begin{cases} MV\_0.row = RefMV.row * (X - A)/(C - C\_R0) \\ MV\_0.col = RefMV.col * (X - A)/(C - C\_R0) \end{cases} \quad (2)$$

In equation (2), MV_0 can be the second temporal motion vector candidate 814, and X, A, C, and C_R0 are the frame indexes of the current frame 800 and the reference frames 808, 804, and 806, respectively. As such, a temporal motion vector candidate (e.g., the second temporal motion vector candidate 814) for the current block can be determined by projecting a reference block onto a third reference frame (i.e., the reference frame 808) to determine a temporal motion vector candidate. That is a temporal motion vector candidate can be determined using respective display positions of the encoded frame (e.g., X), a first reference frame (e.g., C), and the third reference frame (e.g., A). The temporal motion vector candidate can be added to the motion vector candidate list. Projecting the reference block onto the second reference frame can use the respective motion vector of the reference block with respect to a third reference frame, a frame index of the current frame, a first reference index of the first reference frame, and a second frame index of the second reference frame.

Similarly, the technique 1000 can estimate the motion vector MV_1 at the same block position (Block_Row, Block_Col) of the current block 802 towards the reference frame 804 using equation (3):

$$\begin{cases} MV\_1.row = RefMV.row * (X - C)/(C - C\_R0) \\ MV\_1.col = RefMV.col * (X - C)/(C - C\_R0) \end{cases} \quad (3)$$

In the equation (3), MV_1 can be the first temporal motion vector candidate 812, and X, C, and C_R0 are the frame indexes of the current frame 800 and the reference frames 804 and 806, respectively.

Some codecs perform motion compensated (i.e., inter) prediction at the sub-pixel (i.e., sub-pel) level. That is, a motion vector may point to a location that is between pixels of blocks in the reference frame. This may be referred to as sub-pixel resolution. Examples of sub-pixel resolutions include ¼ sub-pel and ⅛ sub-pel resolutions. Other resolutions are possible. Other codecs may not allow sub-pixel motion compensation and the motion vectors align with full pixels (also called integer pixels). As such, a codec can allow predefined sub-pixel locations. Accordingly, in some implementations, the technique 1000 can include aligning a result of the projecting (e.g., the second temporal motion vector candidate 814) such that the second reference block (e.g., the block 818) aligns with a predefined sub-pixel location of the second reference frame. In an example, the temporal motion vector candidate is rounded to the nearest $\frac{1}{8}^{th}$ sub-pixel location.

As indicated above, prior to the coding (i.e., encoding by an encoder or decoding by a decoder) of a current frame, the technique 1000 can go through all the blocks that have valid motion information within each reference frame of a current frame to estimate the motion field for the entire current frame in the unit of a certain block size. The unit size can be 4×4, 8×8, or any other size.

At 606, 608, and 610, which are as described with respect to the technique 600, the technique 1000 selects a motion vector from a motion vector candidate list, can generate a prediction block using the selected motion vector, and encode the current block using the prediction block, respectively.

In an implementation by an encoder, the technique 1000 can include encoding, in an encoded bitstream, such as the compressed bitstream 420 of FIG. 4, a packet. As described with respect to FIG. 8, the packet can include the current frame and a packet stamp that indicates whether the current frame is to be displayed by a decoder when packets having the packet stamp are received.

In an implementation by a decoder, the technique 1000 can include decoding, from an encoded bitstream, such as the compressed bitstream 420 of FIG. 5, a packet that includes the current frame and a packet stamp, the packet stamp indicating whether the current frame is to be displayed when packets having the packet stamp are received In an implementation of the technique 1000, the first reference block is within a range of the current block. That is, the motion vector projection can be constrained to be within a range. The range can be limited in the horizontal direction, the vertical direction, or both directions as described with respect to FIGS. 11 and 12.

Figure 11:
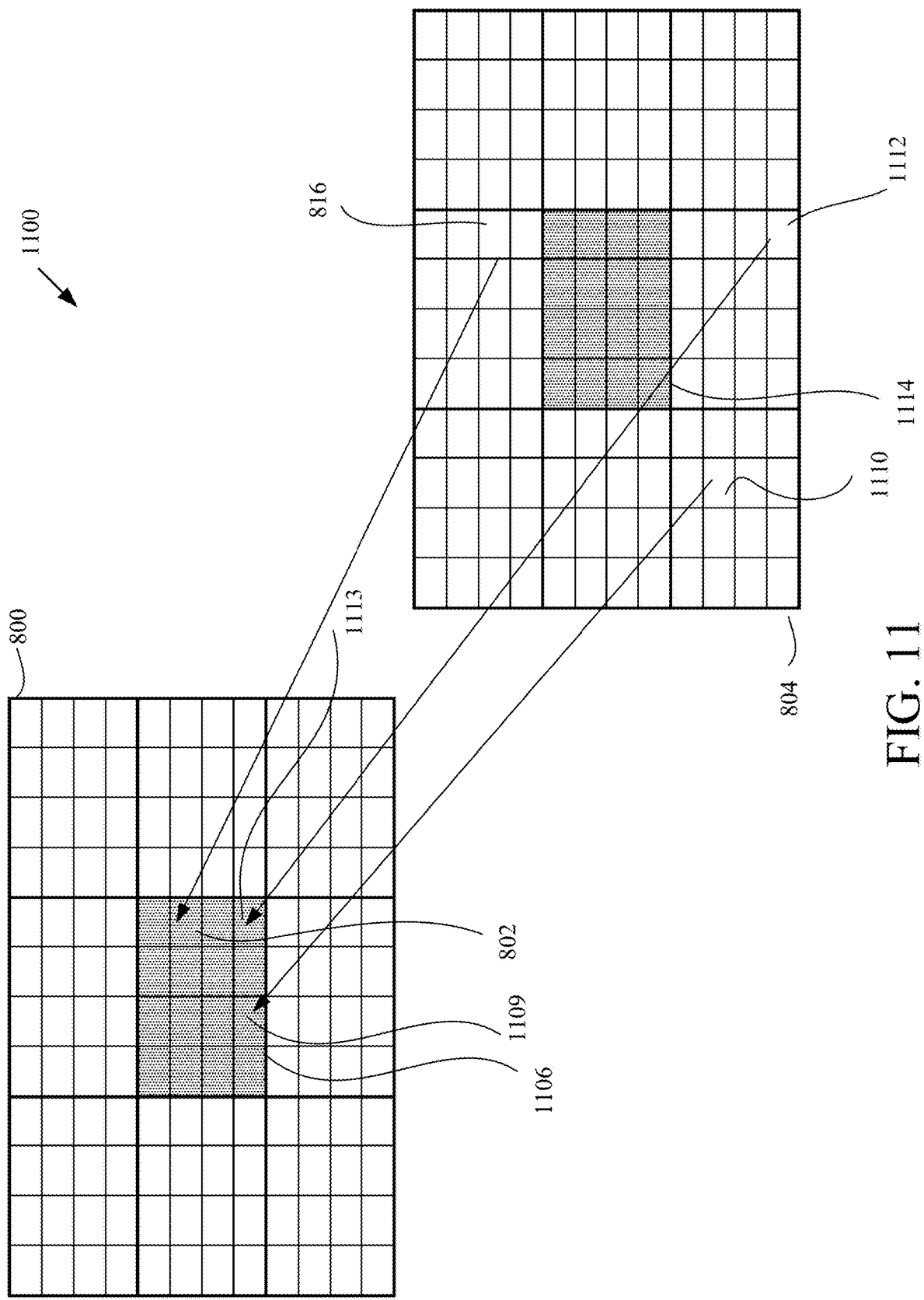
FIG. 11 is a diagram of projecting motion vectors of blocks of a reference frame onto a current frame according to implementations of this disclosure.

FIG. 11 is a diagram 1100 of projecting motion vectors of blocks of a reference frame onto a current frame according to implementations of this disclosure. The diagram 1100 includes the reference frame 1 804 and the current frame 800 of FIG. 8. As described above, the motion vector of the block 816 is projected onto the current frame 800 intersecting the current frame 800 at the current block 802. As such, the current block 802 can be identified as a projection of the block 816.

The diagram 1100 also includes a processing unit 1106 (i.e., a processing unit of the encoded frame) and a collocated region 1114 in the reference frame 1 804. In an example, the processing unit can be a 64×64 unit. A codec processes a frame in processing units. A processing unit can include multiple blocks. For example, if the processing unit is processed in 4×4 blocks, then the processing unit can include 16 current blocks, and if the processing unit is processed in 8×8 blocks, then the processing unit can include eight (8) current blocks. A codec can process the blocks of the processing unit in raster scan order.

Before coding a current block (e.g., the current block 802), and more specifically, before coding any block of the current frame, blocks of a reference frame (e.g., the reference frame 1 804) that are associated with motion vectors are projected (e.g., via a linear projection) onto the current frame. In the case that every block of the reference frame is associated with a motion vector, the projection operation may be performed for each 4×4, 8×8, or any other predetermined block resolution (i.e., block size) of the reference frame. The predetermined block resolution can be dependent on the codec hardware implementation.

The blocks of a processing unit in the current frame can be identified as projected from any block of the reference frame. For example, the current block 802 is identified as being projected from the block 816 (as is also shown in FIG. 8), a block 1109 is identified as being projected from a block 1110, and a block 1113 is identified as being projected from a block 1112.

If projections are not constrained, then a current block of a current frame can be projected from any block of a reference frame. As such, in order to code a current block using motion field estimation, then the motion vector of any of the blocks of the reference frame may be needed. The motion vectors of all the blocks of the reference frame that have associated motion vectors are to be moved from, e.g., DRAM to a cache, such as SRAM.

As explained above, the bandwidth between DRAM and SRAM is limited. Therefore, the greater the amount of data that is to be moved from DRAM to SRAM, the greater the latency in a hardware-implemented codec. Reducing the amount of data transferred or moved from DRAM to SRAM, reduces the latency. The amount of data that is transferred from DRAM or SRAM can be limited by selecting reference blocks that constitute a subset of the blocks of the first reference frame. Selecting reference blocks is equivalent to selecting the motion vectors associated with those selected reference blocks. In an implementation, selecting the subset of the blocks of the reference frame can be via constraining the motion vector projection as described below. Temporal motion vector candidates for the current block can then be determined using respective motion vectors of the reference blocks that are selected.

Constraining the motion vector projection can reduce the amount of data transferred from DRAM to SRAM. Constraining the motion vector projections can ensure that a motion field motion vector associated with a given coding block (i.e., a current block) position is projected from a reference motion vector originated from an extended collocated region in the reference frame. The extended region is limited in vertical and horizontal offset as described below.

The constraint in the vertical direction can be of the same or different size than the constraint in the horizontal direction. For example, the motion vector projection can be contained to (−32, 32) pixel range in height (i.e., the vertical direction) and (−64, 64) pixel range in width (i.e., the horizontal direction). An example of constraining the motion vector projection is now given. Assume that a motion vector is given by the row and column offsets (10, 15) and assume further that a projection of this motion vector results in a projection of (43, 30). As 43−10 (i.e., 43 minus 10) is greater than the acceptable range (i.e., 10±32), the projection is deemed out of range.

Referring back to the equation (1), and using a range of (−32, 32) in the vertical direction and (−64, 64) in the horizontal direction, constraining the motion vector projection can mean that if the absolute difference between the calculated Block_Row and the RefMV.row is greater than 32 pixels (i.e., |Block_Row −RefMV.row|>32) and/or the absolute difference between the calculated Block_Col and the RefMV.col is greater than 64 pixels (i.e., Block_Col−RefMV.col|>64), then the projection can be considered out of range and/or invalid. If a projection is invalid, then the block of the current frame is not identified as being projected from the reference block. For example, if the projection of the block 816 onto the current frame 800 is invalid (i.e., is out of range), then the current block 802 is not identified as a projection of the block 816 (i.e., a first reference block) of a first reference frame onto the current frame (i.e., the current frame 800).

By constraining the motion vector projections, the technique 1000 can be used to load only the needed reference motion vectors for a processing unit (e.g., a processing unit of size 64×64) from DRAM to SRAM. The loaded reference motion vectors can be used to process the linear projection ahead of each 64×64 block coding (i.e., encoding or decoding). That is, before coding the blocks of the processing unit 1106, the motion vectors that are loaded are those that resulted in valid motion vector projections of blocks of the processing unit 1106.

In an example, the linear projection can use at most three (3) reference frames, namely, a first reference frame that is the immediate last reference frame to the current frame and two (2) reference frames from the nearest frames ahead of the current frame. For those frames ahead of current frame in the display order (i.e., frames that have higher frames indexes than the current frame), the projection operation amounts to an interpolation operation. As such, only one (1) motion vector is loaded per 4×4 block for each of the two (2) future frames. The last of the two future frames can use compound prediction. As such, a block of the last of the two future frames can include, in the case of inter+inter prediction, two motion vectors that can both be projected onto (i.e., interested with) the current frame. As such, if available, the two motion vectors from the past reference frame can be used.

The number of reference motion vectors needed (i.e., copied from DRAM) per 64×64 processing unit can be given by total number of pixels divided by the coding block size (i.e., block resolution). The total number of pixels can be giving by equation (4):

$$\text{Total Pixels} = \frac{\text{Number of Reference Frames} * \text{Height Pixels} * \text{Width Pixels}}{\text{Block resoultion}} \quad (4)$$

Using the examples above, Number of Reference Frames is the number of reference frames that are available to a current frame: an immediate past reference frame, a first nearest future frame, and a last nearest future frame that uses two reference frames. As such, the Number of Reference Frames is (1+1+2)=4.

The linear projections of blocks can be operated independently. As such, it is possible to use single instruction, multiple data (SIMD) optimization in software-implemented codecs. A coding scheme for motion estimation can use up to seven (7) reference frames: 4 in the past and 3 ahead. As described above, in an implementation, motion field estimation uses the nearest reference frames. This results in a maximum amount of motion vector frame storage in a GOP to be 1 in the past and 3 ahead for a total of 4 reference frames. However, more reference frames can be used.

Figure 12:
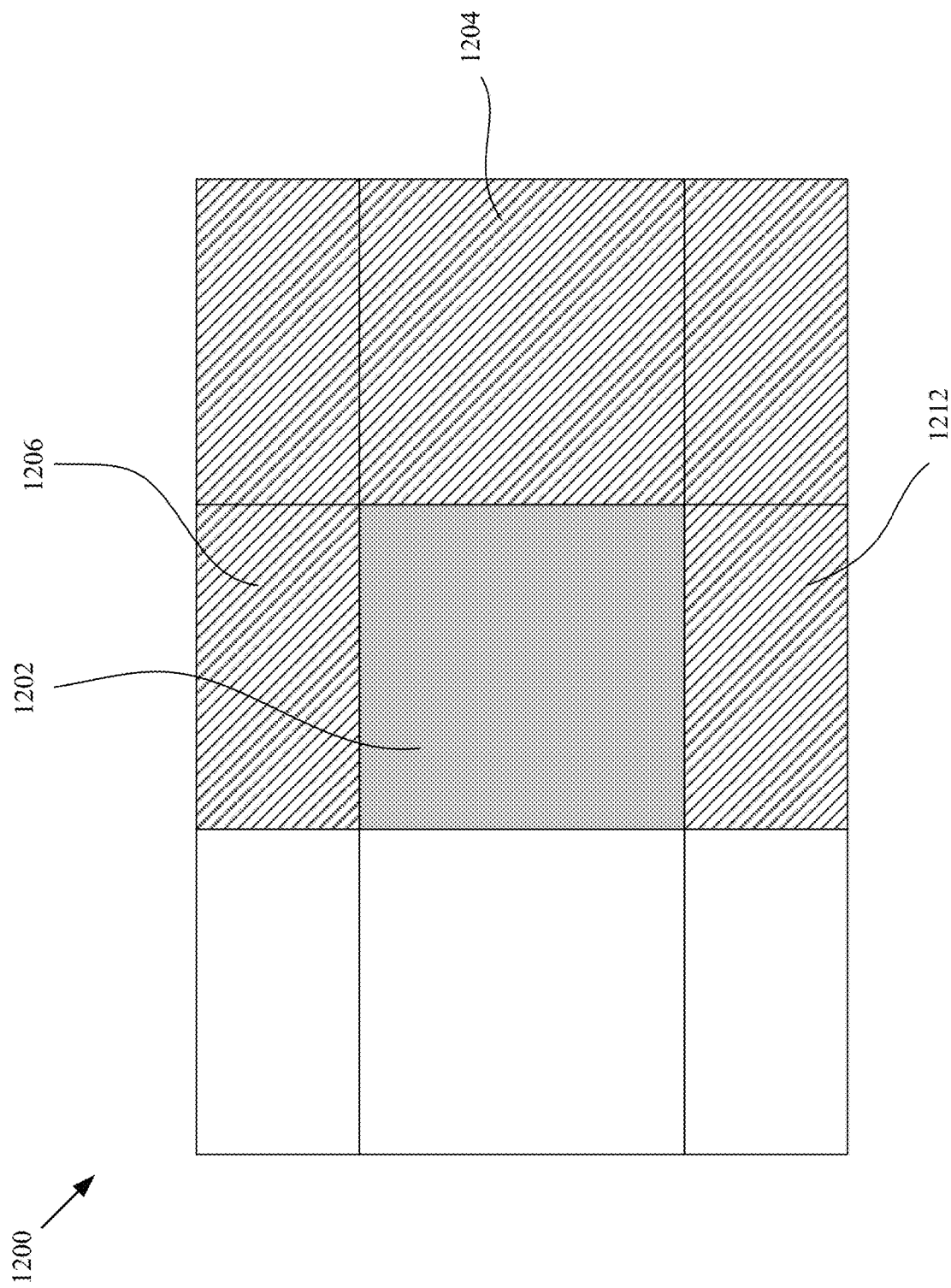
FIG. 12 is a diagram of a motion vector referencing region for a processing unit according to implementations of this disclosure.

FIG. 12 can be used to describe Height Pixels and Width Pixels. FIG. 12 is a diagram of a motion vector referencing region 1200 for a processing unit according to implementations of this disclosure. For a processing unit, such as the processing unit 1106 of FIG. 11, the motion vector referencing region 1200 is the region in a reference frame the motion vectors of which are used for the projection operation. The motion vector referencing region 1200 is also referred to as an extended collocated processing unit. FIG. 12 includes a collocated region 1202, such as the collocated region 1114 of FIG. 11 and a right region 1204 that is equal in size to the collocated region 1202. The collocated region 1202 can have the same size as the processing unit. As mentioned above, a frame is processed in raster order. As such, once the technique 1000 completes processing the blocks of the collocated region 1202, the right region 1204 (to the right of the collocated region 1202 and having a size equal to the processing unit) is processed next. As such, the width value for a range (e.g., ±64 pixels) can be selected to be higher than the height value (e.g., ±32 pixels), since the right portion of the reference motion vector array can be re-used by the next 64×64 block decoding.

Height Pixels, or pixels in the vertical direction, can be given by the size of the processing unit (or the corresponding collocated region in the reference frame) and the number of pixels above and below the collocated region as given by the range constraint in the vertical direction. As such, Height Pixels is equal to the vertical height of the collocated region 1202, pixels of an above region 1206 corresponding to the region constraint of −32, and pixels of a below region 1212 corresponding to the region constraint of +32. As such, the Height Pixels is equal to (64+32*2)=128.

Width Pixels, or pixels in the horizontal direction, can be given by the size of the processing unit (or the corresponding collocated region in the reference frame) and the number of pixels to the right and left of the collocated region as given by the range constraint in the horizontal direction. As such, Width Pixels is equal to the horizontal length of the collocated region 1202, pixels of the right region 1204 corresponding to the region constraint of +64, and pixels of a left region corresponding to the region constraint of −64. As such, the Width Pixels is equal to (64+64*2)=192.

If the reference motion vectors are stored for 4×4 block units, the Block Resolution is 4×4=16. The Total Pixels is equal to (4×128×192)=98,304; and the number of motion vectors is 98,304/(4×4)=6,144 motion vectors. If the Block Resolution is 8×8=64, then The number of motion vectors is equal to (98,304)/(8×8)=1,536 motion vectors. Depending a codec's hardware design (e.g., processing unit size and/or block resolution), up to two-thirds of the total number of motion vectors used for a processing unit can be reused in the processing of the next processing unit (e.g., the processing unit that is to the right of the processing unit 1106 of FIG. 11. That is, two-thirds of the shared area of FIG. 12 can be reused by next processing unit (e.g., 64×64 processing unit) coding.

Figure 13:
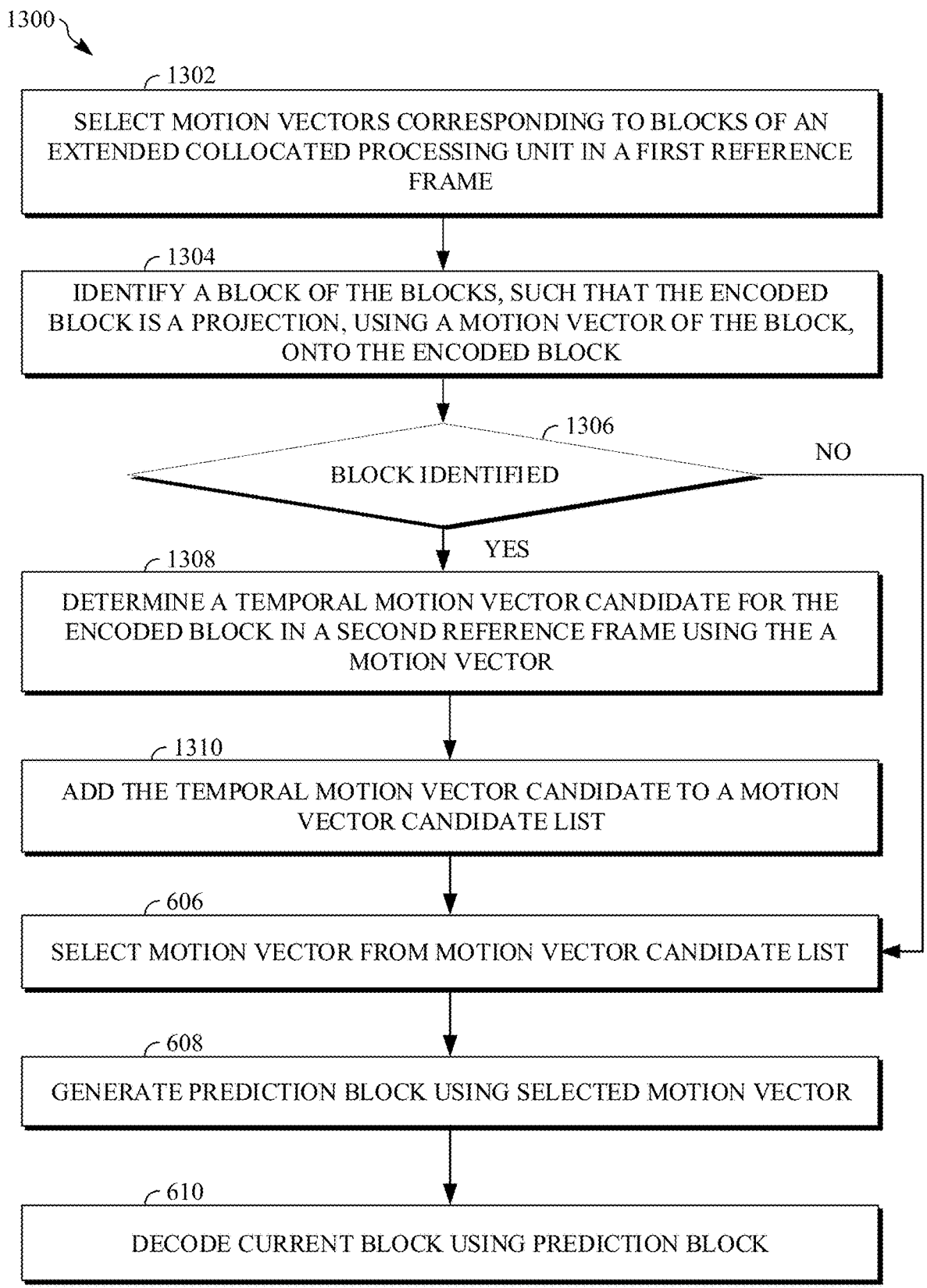
FIG. 13 is a flowchart diagram of an example of a technique for decoding an encoded block of an encoded frame according to an implementation of this disclosure.

FIG. 13 is a flowchart diagram of an example of a technique 1300 for decoding an encoded block of an encoded frame according to an implementation of this disclosure. The encoded frame is processed in processing units. The technique 1300 can be implemented, for example, as a software program that may be executed by computing devices such as the receiving station 106. For example, the software program can include machine-readable instructions that may be stored in a memory such as the memory 204 or the secondary storage 214, and that, when executed by a processor, such as the processor 202, may cause the computing device to perform the technique 1000. The technique 1300 can be implemented using specialized hardware or firmware. As explained above, some computing devices may have multiple memories or processors, and the operations described in one or both of the technique 1000 can be distributed using multiple processors, memories, or both.

At 1302, the technique 1300 selects motion vectors corresponding to blocks of an extended collocated processing unit in a first reference frame. The extended collocated processing unit can be as described with respect to FIG. 12. In an implementation, the extended collocated processing unit extends the current processing unit in a range of −32 to +32 pixels in a height direction and a range of −64 to +64 pixels in a width direction.

At 1304, the technique 1300 identifies a block of the blocks, such that the encoded block is a projection, using a motion vector of the block, onto the encoded block. For example, the technique 1300 identifies the current block 802 (i.e., the encoded block) as a projection of the block 816 (i.e., the identified block of the blocks) using the reference motion vector 810 (i.e., the motion vector of the block). To identify the block, the technique 1300 can perform a motion field estimation as described above. For example, the block 816 can be identified as corresponding to the motion vector resulting in a projection using the equation 1 onto the encoded block.

In some situations, the encoded block may not be the result of any valid projection. For example, the encoded block may be the result of an out-of-range projection. Alternatively, no motion vector projection of blocks of the reference frame may have intersected with the encoded frame at the encoded block. As such, at 1306, the technique 1300 determines whether a block was identified. On condition that a block is identified, the technique 1300 proceeds to 1308; otherwise the technique 1300 proceeds to 606.

At 1308, the technique 1300 determines a temporal motion vector candidate for the encoded block in a second reference frame using a motion vector of the identified block. For example, the temporal motion vector candidate can be determined using the equation (2) and/or the equation (3). The temporal motion vector candidate can be further determined using the display positions of the encoded frame, the first reference frame, and the second reference frame. The display positions can be determined using header information that includes frame offset values and packet stamp values as described above. At 1310, the technique 1300 adds the temporal motion vector candidate to a motion vector candidate list. The blocks 606, 608, and 610 can be as described with respect to FIG. 6.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding an encoded block of an encoded frame, the encoded frame is processed in processing units, wherein a processing unit comprises blocks of the encoded frame including the encoded block, the method comprising:
    selecting motion vectors corresponding to blocks of an extended collocated processing unit in a first reference frame;
    identifying a reference block of the first reference frame, such that the encoded block is a valid projection, using a motion vector of the reference block that refers to a third reference frame that is different from the encoded frame, onto the encoded frame, wherein the valid projection of the reference block onto the encoded frame using the motion vector of the reference block intersects the encoded frame at the encoded block, and wherein the valid projection comprises a scaling of the motion vector of the reference block using respective display orders of the encoded frame, the first reference frame, and the third reference frame;
    determining a temporal motion vector candidate for the encoded block in a second reference frame using a motion vector of the identified reference block and respective display orders of the encoded frame, the first reference frame, the second reference frame, and the third reference frame;
    adding the temporal motion vector candidate to a motion vector candidate list;
    selecting a motion vector from the motion vector candidate list;
    generating a prediction block for the encoded block using the selected motion vector; and
    decoding the encoded block using the prediction block.

2. The method of claim 1, where in the processing unit is of size 64×64.

3. The method of claim 2, wherein the extended collocated processing unit extends in a range of −32 to +32 pixels in a height direction and a range of −64 to +64 pixels in a width direction of the processing unit.

4. The method of claim 1, wherein the respective display orders are determined using header information comprising frame offset values and packet stamp values.

5. A method for coding a current block of a current frame, the current frame being processed in processing units, wherein a processing unit comprises blocks of the current frame including the current block, the method comprising:
    projecting a reference block of a first reference frame onto the current frame to identify the current block as a projection of the reference block onto the current frame,
        wherein the projecting uses a reference motion vector of the reference block, the reference motion vector refers to a second reference frame that is different from the current frame,
        wherein the reference block having a reference location in the first reference frame, and
        wherein the current block having a current location in the current frame;
    determining a temporal motion vector for the current block by:
        on a condition that an absolute difference between the reference location and the current location not exceeding a threshold, determining a first candidate temporal motion vector for the current block in a third reference frame using respective display orders of the current frame, the first reference frame, the second reference frame, and the third reference frame; and
    coding the current block using the temporal motion vector.

6. The method of claim 5, wherein determining the temporal motion vector for the current block further comprising:
    on a condition that the absolute difference between the reference location and the current location exceeding the threshold, determining a second temporal motion vector for the current block using inter-prediction.

7. The method of claim 5, wherein determining the temporal motion vector for the current block further comprising:
    adding the first candidate temporal motion vector to a motion vector candidate list; and
    selecting the temporal motion vector from the motion vector candidate list.

8. The method of claim 5, wherein the threshold is based on a size of the processing unit.

9. The method of claim 8, wherein the threshold comprises at least one of a vertical threshold or a horizontal threshold.

10. The method of claim 9, wherein the vertical threshold is equal to a half of vertical size of the processing unit.

11. The method of claim 9, wherein the horizontal threshold is equal to a horizontal size of the processing unit.

12. The method of claim 8, wherein the size of the processing unit is 64×64.

13. An apparatus for coding a current block a current frame, the current frame being processed in processing units, wherein a processing unit comprises blocks of the current frame including the current block, the apparatus performs steps comprising:
    projecting a reference block of a first reference frame onto the current frame to identify the current block as a projection of the reference block onto the current frame,
        wherein the projecting uses a reference motion vector of the reference block, the reference motion vector refers to a second reference frame that is different from the current frame,
        wherein the reference block having a reference location in the first reference frame, and
        wherein the current block having a current location in the current frame;
    determining a temporal motion vector for the current block by:
        on a condition that an absolute difference between the reference location and the current location not exceeding a threshold, determining a first candidate temporal motion vector for the current block in a third reference frame using respective display orders of the current frame, the first reference frame, the second reference frame, and the third reference frame; and
    coding the current block using the temporal motion vector.

14. The apparatus of claim 13, wherein determining the temporal motion vector for the current block further comprising:
    on a condition that the absolute difference between the reference location and the current location exceeding the threshold, determining a second temporal motion vector for the current block using inter-prediction.

15. The apparatus of claim 13, wherein determining the temporal motion vector for the current block further comprising:
  adding the first candidate temporal motion vector to a motion vector candidate list; and
  selecting the temporal motion vector from the motion vector candidate list.

16. The apparatus of claim 13, wherein the threshold is based on a size of the processing unit.

17. The apparatus of claim 16, wherein the threshold comprises at least one of a vertical threshold or a horizontal threshold.

18. The apparatus of claim 17, wherein the vertical threshold is equal to a half of vertical size of the processing unit.

19. The apparatus of claim 17, wherein the horizontal threshold is equal to a horizontal size of the processing unit.

20. The apparatus of claim 16, wherein the size of the processing unit is 64×64.

\* \* \* \* \*